US012578600B2

(12) United States Patent
Kim et al.

(10) Patent No.: US 12,578,600 B2
(45) Date of Patent: Mar. 17, 2026

(54) DISPLAY DEVICE

(71) Applicant: LG ELECTRONICS INC., Seoul (KR)

(72) Inventors: Youngdae Kim, Seoul (KR); Jeongwoo Choi, Seoul (KR); Jihee Park, Seoul (KR); Jaeyoon Jeong, Seoul (KR); Sohee An, Seoul (KR); Jeonggyu Kim, Seoul (KR); Nayeon Jung, Seoul (KR); Seongjun Kim, Seoul (KR); Jinhwan Kim, Seoul (KR); Minyoung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/894,441

(22) Filed: Sep. 24, 2024

(65) Prior Publication Data

US 2025/0123518 A1      Apr. 17, 2025

(30) Foreign Application Priority Data

Oct. 12, 2023    (KR) ........................ 10-2023-0135707

(51) Int. Cl.
G02F 1/13357       (2006.01)
G02F 1/1335        (2006.01)

(52) U.S. Cl.
CPC .. G02F 1/133605 (2013.01); G02F 1/133607 (2021.01); G02F 1/133608 (2013.01); G02F 1/133611 (2013.01)

(58) Field of Classification Search
CPC ......... G02F 1/133607; G02F 1/133608; G02F 1/133611; G02F 1/133314; G02F 1/133605; G02F 1/133603; G02F 2201/46
See application file for complete search history.

(56) References Cited

U.S. PATENT DOCUMENTS

| | | | |
|---|---|---|---|
| 9,904,104 B2 * | 2/2018 | Matsumoto | ....... G02F 1/133606 |
| 2012/0063150 A1 * | 3/2012 | Takeuchi | ................. G09F 9/33 |
| | | | 362/308 |

(Continued)

FOREIGN PATENT DOCUMENTS

| | | | |
|---|---|---|---|
| JP | 2011003549 A | * | 1/2011 |
| KR | 10-2016-0051570 | | 5/2016 |

(Continued)

OTHER PUBLICATIONS

European Patent Office Application Serial No. 24205136.5, Search Report dated Feb. 25, 2025, 11 pages.

(Continued)

*Primary Examiner* — Erin Kryukova
(74) *Attorney, Agent, or Firm* — LEE, HONG, DEGERMAN, KANG & WAIMEY

(57)       ABSTRACT

A display device may include a display panel; a frame; a light source located on a substrate; a lens including a body spaced apart from the substrate and covering the light source, and legs protruding from the body and coupled to the substrate; and a reflective sheet having a hole in which the lens is located and covering the substrate, wherein a boundary of the hole comprises: first and second straight sections opposite each other with respect to a center of the hole; first and second curved sections opposite each other with respect to the center of the hole and connecting the first and second straight sections; and an end of a protrusion protruding from the first straight section or the second straight section toward an inside of the hole, and wherein a portion of a rear surface of the body may overlap the protrusion in a forward-backward direction.

17 Claims, 19 Drawing Sheets

(56)        References Cited

U.S. PATENT DOCUMENTS

2013/0050588 A1     2/2013  Kamada
2016/0370652 A1 *  12/2016  Hwang ............. G02F 1/133606
2019/0154234 A1 *   5/2019  Oh ................... G02F 1/133605
2021/0026200 A1     1/2021  Oh et al.
2023/0013359 A1 *   1/2023  Huang ..................... F21V 7/05

FOREIGN PATENT DOCUMENTS

KR        10-2137135         7/2020
WO        2021-070993        4/2021
WO     WO-2021070993 A1 *   4/2021   ....... G02F 1/133628

OTHER PUBLICATIONS

Korean Intellectual Property Office Application No. 10-2023-0135707, Office Action dated Sep. 23, 2025, 3 pages.

* cited by examiner

FIG. 8

DISPLAY DEVICE

CROSS-REFERENCE TO RELATED APPLICATION

Pursuant to 35 U.S.C. § 119(a), this application claims the benefit of earlier filing date and right of priority to Korean Patent Application No. 10-2023-0135707, filed on Oct. 12, 2023, the contents of which are all hereby incorporated by reference herein in their entireties.

BACKGROUND OF THE INVENTION

Field of the Invention

The present disclosure relates to a display device.

Description of the Related Art

With the advent of the information society, various demands for display devices are increasing. Various display devices, such as liquid crystal display (LCD) devices, plasma display panel (PDP) devices, electroluminescent display (ELD) devices, and vacuum fluorescent display (VFD) devices, have recently been studied and used to meet various demands for display devices.

Thereamong, an LCD panel includes a thin-film transistor (TFT) substrate and a color substrate, which are disposed opposite each other, with a liquid crystal layer interposed therebetween. The LCD panel may display an image using light provided from a backlight unit.

In recent years, interest in the image quality of display devices has increased, and thus representation or reproduction of color close to true color has attracted significant attention. Various studies have been conducted on improvement in light uniformity and improvement in image quality for implementing true color.

SUMMARY OF THE INVENTION

It is an object of the present disclosure to solve the above and other problems.

Another object of the present disclosure may be to provide a display device capable of improving image quality.

Another object of the present disclosure may be to provide a display device capable of preventing a phenomenon in which a reflective sheet caught between a substrate and a lens is separated therefrom.

Another object of the present disclosure may be to provide a display device capable of solving a problem in which a reflective sheet is not reliably inserted into a region between a substrate and a lens or is separated from the region between the substrate and the lens, thereby minimizing the occurrence of mura in a screen.

Another object of the present disclosure may be to provide various examples of protrusions of a reflective sheet that is caught by a lens.

Another object of the present disclosure may be to provide a display device capable of minimizing a phenomenon in which a portion of a screen corresponding to a portion of a reflective sheet is brighter than the remaining portion of the screen corresponding to the remaining portion of the reflective sheet or in which regions of the screen have a difference in the purity of white light.

Another object of the present disclosure may be to provide various examples of light patterns of a reflective sheet.

In order to accomplish the above and other objects, a display device according to one aspect of the present disclosure may include a display panel, a frame located behind the display panel, a substrate located between the display panel and the frame, a light source located on the substrate, a lens including a body spaced apart from the substrate and covering the light source, and legs protruding from the body toward the substrate and coupled to the substrate, and a reflective sheet having a hole in which the lens is located and covering the substrate, wherein a boundary of the hole of the reflective sheet may include: first and second straight sections opposite each other with respect to the center of the hole, first and second curved sections opposite each other with respect to the center of the hole and connecting the first and second straight sections; and an end of a protrusion protruding from the first straight section or the second straight section toward the inside of the hole, and wherein a portion of a rear surface of the body of the lens may overlap the protrusion in a forward-backward direction.

BRIEF DESCRIPTION OF THE DRAWINGS

The above and other objects, features and advantages of the present disclosure will be more apparent from the following detailed description in conjunction with the accompanying drawings, in which:

FIGS. 1 to 19 are diagrams illustrating examples of a display device according to embodiments of the present disclosure.

DETAILED DESCRIPTION

Figure 1:
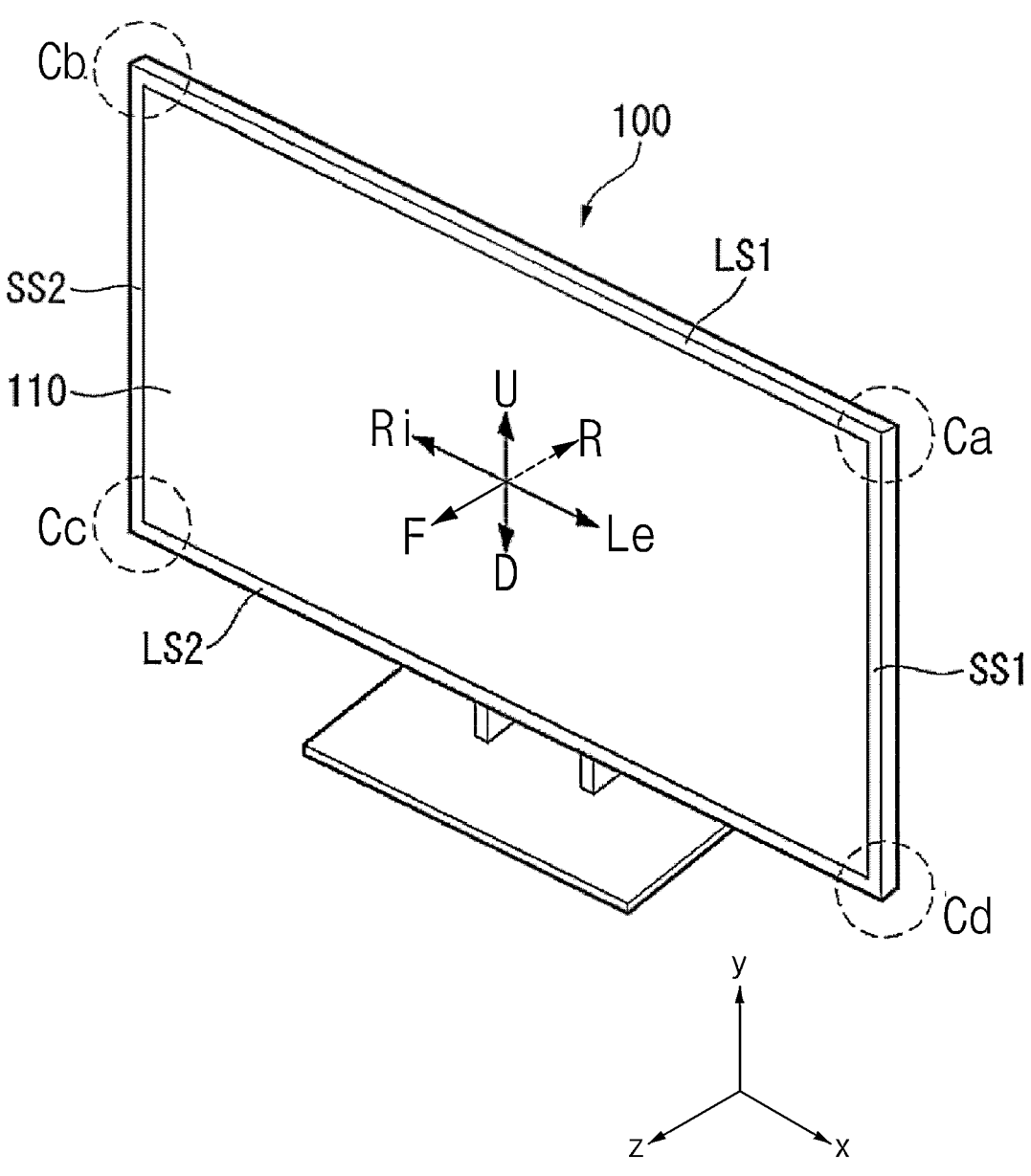

Hereinafter, the embodiments disclosed in the present specification will be described in detail with reference to the accompanying drawings, and the same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description, and do not have mutually distinguished meanings or functions.

In the following description of the embodiments disclosed in the present specification, a detailed description of known functions and configurations incorporated herein will be omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and sprit of the present invention.

It will be understood that although the terms "first", "second", etc., may be used herein to describe various components, these components should not be limited by these terms. These terms are only used to distinguish one component from another component.

It will be understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

As used herein, the singular form is intended to include the plural forms as well, unless the context clearly indicates otherwise.

It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

In the embodiments illustrated in the drawings, representations of directions, such as up (U), down (D), left (Le), right (Ri), front (F), and rear (R), are merely for convenience of explanation, and are not intended to limit the technical features disclosed in this specification.

Referring to FIG. 1, a display device 100 may include a display panel 110. The display panel 110 may display images.

The display device 100 may include a first long side LS1, a second long side LS2 opposite the first long side LS1, a first short side SS1 adjacent to the first and second long sides LS1 and LS2, and a second short side SS2 opposite the first short side SS1. For convenience of explanation, the lengths of the first and second long sides LS1 and LS2 are shown and described as being longer than the lengths of the first and second short sides SS1 and SS2. However, the lengths of the first and second long sides LS1 and LS2 may be set to be approximately equal to the lengths of the first and second short sides SS1 and SS2.

A direction parallel to the long sides LS1 and LS2 of the display device 100 may be referred to as a leftward-rightward direction. A direction parallel to the short sides SS1 and SS2 of the display device 100 may be referred to as an upward-downward direction. A direction perpendicular to the long sides LS1 and LS2 and the short sides SS1 and SS2 of the display device 100 may be referred to as a forward-backward direction.

A side of the display panel 110 on which an image is displayed may be referred to as a front side F, z, and a side opposite the front side may be referred to as a rear side R. The first long side LS1 may be referred to as an upper side U, y, and the second long side LS2 may be referred to as a lower side D. The first short side SS1 may be referred to as a left side Le, x, and the second short side SS2 may be referred to as a right side Ri.

The first long side LS1, the second long side LS2, the first short side SS1, and the second short side SS2 may be referred to as edges of the display device 100. Points at which the first long side LS1, the second long side LS2, the first short side SS1, and the second short side SS2 meet each other may be referred to as corners.

A point at which the first short side SS1 and the first long side LS1 meet each other may be referred to as a first corner Ca. A point at which the first long side LS1 and the second short side SS2 meet each other may be referred to as a second corner Cb. A point at which the second short side SS2 and the second long side LS2 meet each other may be referred to as a third corner Cc. A point at which the second long side LS2 and the first short side SS1 meet each other may be referred to as a fourth corner Cd.

Figure 2:
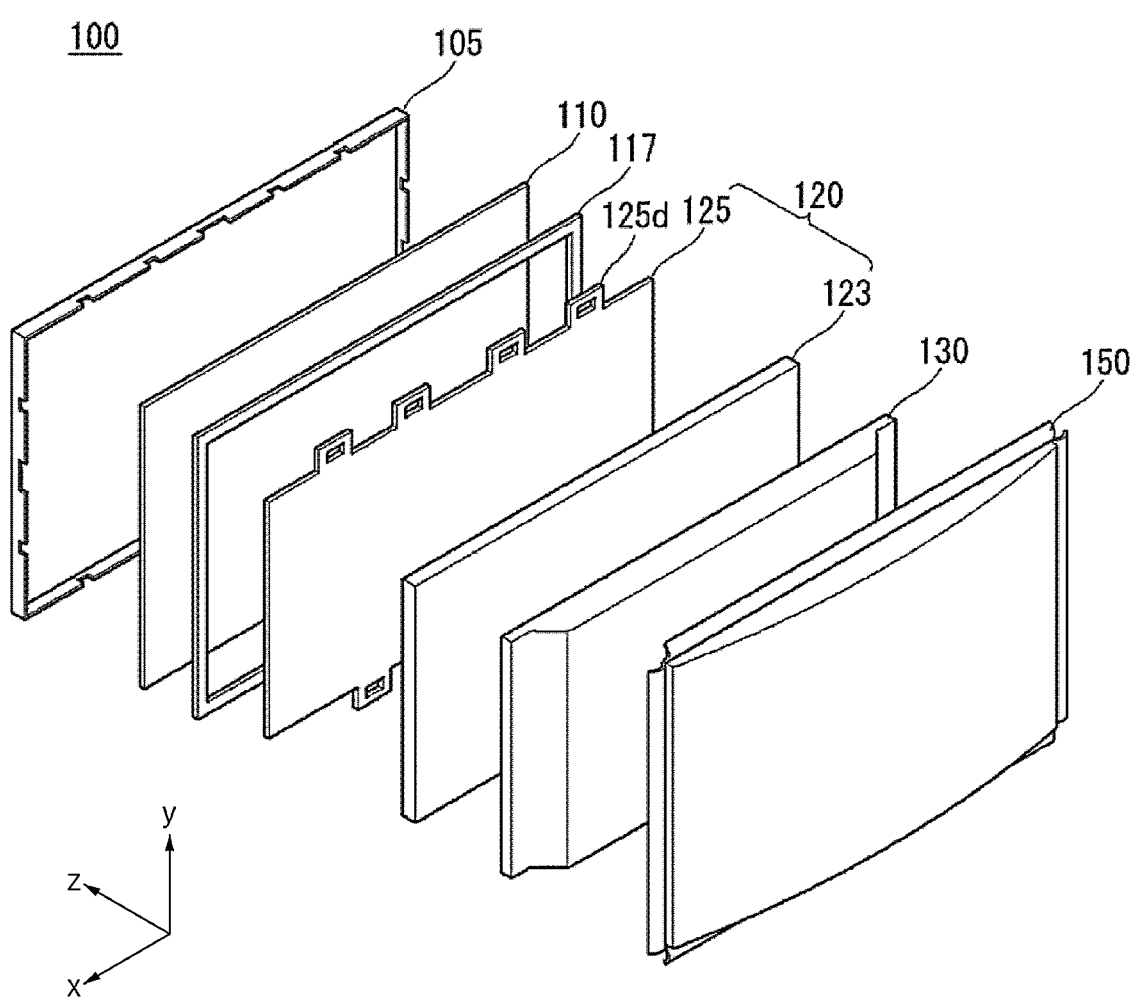

Referring to FIG. 2, the display device 100 may include a display panel 110, a front cover 105, a guide panel 117, a backlight unit 120, a frame 130, and a back cover 150.

The display panel 110 may form the front surface of the display device 100, and may display an image. The display panel 110 may display an image in such a manner that each of a plurality of pixels outputs red, green or blue (RGB) light according to a predetermined timing. The display panel 110 may be divided into an active area, in which an image is displayed, and a de-active area, in which an image is not displayed. The display panel 110 may include a front substrate and a rear substrate, which are disposed opposite each other, with a liquid crystal layer interposed therebetween. The display panel 110 may be referred to as an LCD panel.

The front substrate may include a plurality of pixels composed of red, green, and blue subpixels. The front substrate may emit red light, green light, or blue light in response to a control signal.

The rear substrate may include switching elements. The rear substrate may switch a pixel electrode. For example, the pixel electrode may change the molecular arrangement of the liquid crystal layer in response to a control signal applied thereto from the outside. The liquid crystal layer may include liquid crystal molecules. The arrangement of the liquid crystal molecules may change according to a voltage difference generated between the pixel electrode and a common electrode. The liquid crystal layer may allow or interrupt the transmission of the light from the backlight unit 120 to the front substrate.

The front cover 105 may cover at least a portion of the front surface and at least a portion of the side surface of the display panel 110. The front cover 105 may be divided into a front-surface cover located on the front surface of the display panel 110 and a side-surface cover located on the side surface of the display panel 110. At least one of the front-surface cover or the side-surface cover may be omitted.

The guide panel 117 may surround the periphery of the display panel 110 and may cover the side surface of the display panel 110. The guide panel 117 may be coupled to the display panel 110 or may support the display panel 110.

The backlight unit 120 may be located behind the display panel 110. The backlight unit 120 may include light sources. The backlight unit 120 may be coupled to the frame 130 at the front side of the frame 130. The backlight unit 120 may be driven in a fully driven manner or a partially driven manner, such as local dimming or impulsive driving. The backlight unit 120 may include an optical sheet 125 and an optical layer 123.

The optical sheet 125 may uniformly transmit the light from the light source to the display panel 110. The optical sheet 125 may be composed of a plurality of layers. For example, the optical sheet 125 may include a prism sheet, a diffusion sheet, or the like. For example, the optical sheet 125 may be a double brightness enhancement film (DBEF). A coupling portion 125d of the optical sheet 125 may be coupled to the front cover 105, the frame 130, or the back cover 150.

The frame 130 may be located behind the backlight unit 120 and may support components of the display device 100. For example, components, such as the backlight unit 120 and a printed circuit board (PCB) on which a plurality of electronic elements is located, may be coupled to the frame 130. The frame 130 may be referred to as a cover bottom 130.

The back cover 150 may cover the rear side of the frame 130. The back cover 150 may be coupled to the frame 130 and/or the front cover 105.

Figure 3:
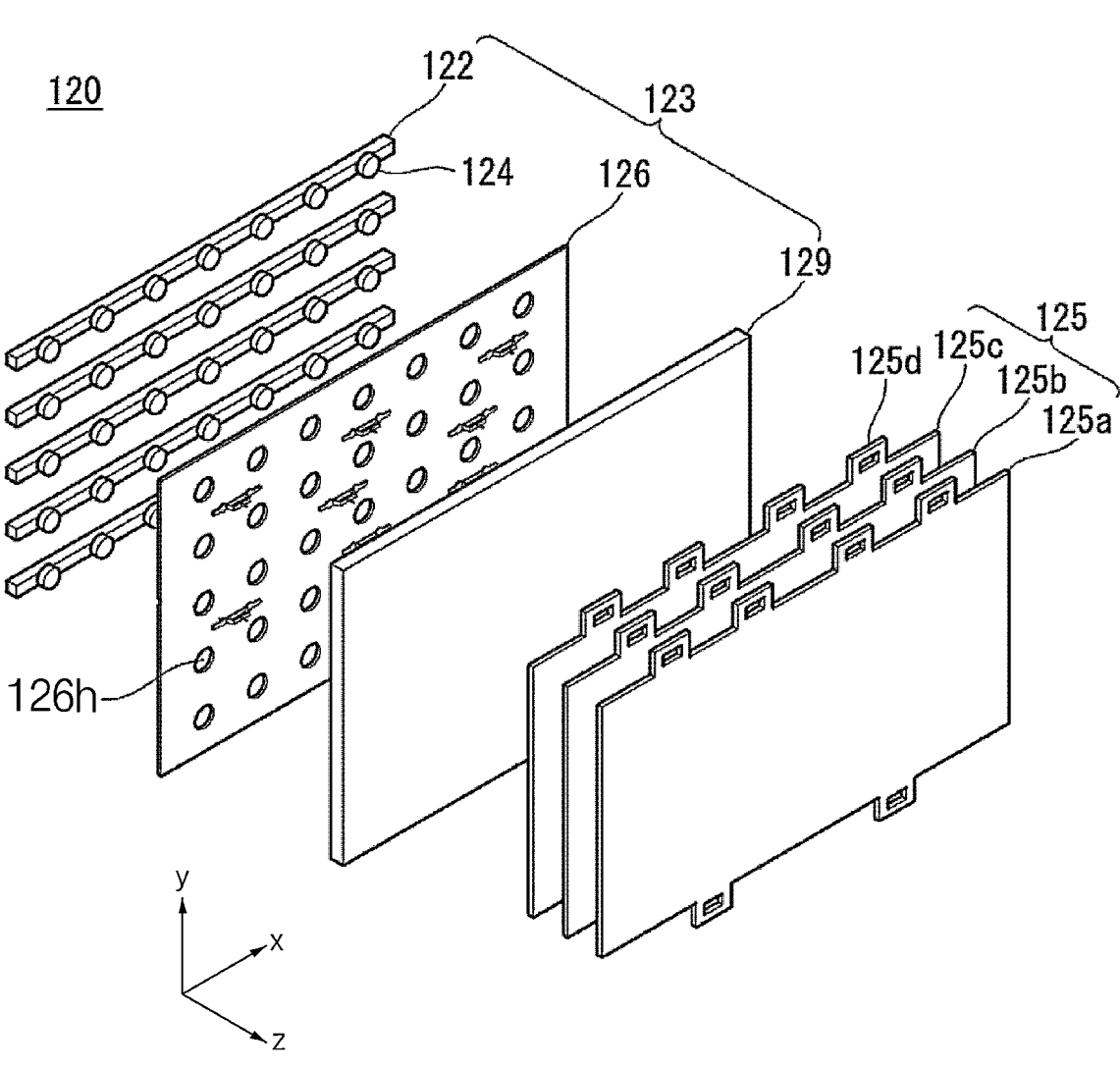

Referring to FIG. 3, the backlight unit 120 may include an optical layer 123 and an optical sheet 125. The optical layer 123 may include a substrate 122, at least one light assembly 124, a reflective sheet 126, and a diffusion plate 129.

The substrate 122 may be coupled to the front surface of the frame 130. The substrate 122 may have a plate shape, or may include a plurality of straps spaced apart from each other in a vertical direction. Alternatively, the substrate 122 may have a fork shape including a first plate that is elongated and a plurality of second plates intersecting the first plate. The substrate 122 may be formed of at least one of polyethylene terephthalate (PET), glass, polycarbonate (PC), or silicon. The substrate 122 may be a printed circuit board (PCB).

At least one light assembly 124 may be mounted on the substrate 122. A plurality of light assemblies 124 may be spaced apart from each other on the substrate 122. An electrode pattern for connecting an adaptor to the light assembly 124 may be formed on the substrate 122. For example, a carbon nanotube electrode pattern for connecting the light assembly 124 to the adaptor may be formed on the substrate 122.

For example, the light assembly 124 may be a light-emitting diode (LED) chip or an LED package including at least one LED chip. The light source of the light assembly 124 may be composed of a white LED or a colored LED, which emits at least one of a red color, a green color, or a blue color. The colored LED may include at least one of a red LED, a green LED, or a blue LED.

The reflective sheet 126 may be located in front of the substrate 122. The reflective sheet 126 may have formed therein a hole 126*h* in which the light assembly 124 is located. The reflective sheet 126 may include a reflective material, for example, at least one of a metal or a metal oxide. For example, the reflective sheet 126 may include a highly reflective metal and/or metal oxide, for example, at least one of aluminum (Al), silver (Ag), gold (Au), or titanium dioxide (TiO2). The reflective sheet 126 may reflect light emitted from the light assembly 124 or light reflected from the diffusion plate 129 in the forward direction.

The diffusion plate 129 may be located in front of the reflective sheet 126. The diffusion plate 129 may diffuse the light emitted from the light assembly 124. A support 200 may be located between the reflective sheet 126 and the diffusion plate 129, and may support the rear surface of the diffusion plate 129. An air gap may be formed between the reflective sheet 126 and the diffusion plate 129, and the light emitted from the light assembly 124 may spread widely due to the air gap. The diffusion plate 129 may be referred to as an optical plate 129.

The optical sheet 125 may be located in front of the diffusion plate 129. The rear surface of the optical sheet 125 may be in close contact with the diffusion plate 129, and the front surface of the optical sheet 125 may be in close contact with or adjacent to the rear surface of the display panel 110. The optical sheet 125 may include at least one sheet.

For example, the optical sheet 125 may include a plurality of sheets having different functions. A first optical sheet 125*a* may be a diffusion sheet, and a second optical sheet 125*b* and a third optical sheet 125*c* may be prism sheets. The prism sheet may collect the light from the diffusion plate 129 and may provide the light to the display panel 110. The diffusion sheet may prevent the light from the diffusion plate 129 from being nonuniformly concentrated, thereby achieving more uniform distribution of the light. The number and/or position of prism sheets and the number and/or position of diffusion sheets may be changed.

Figure 4:
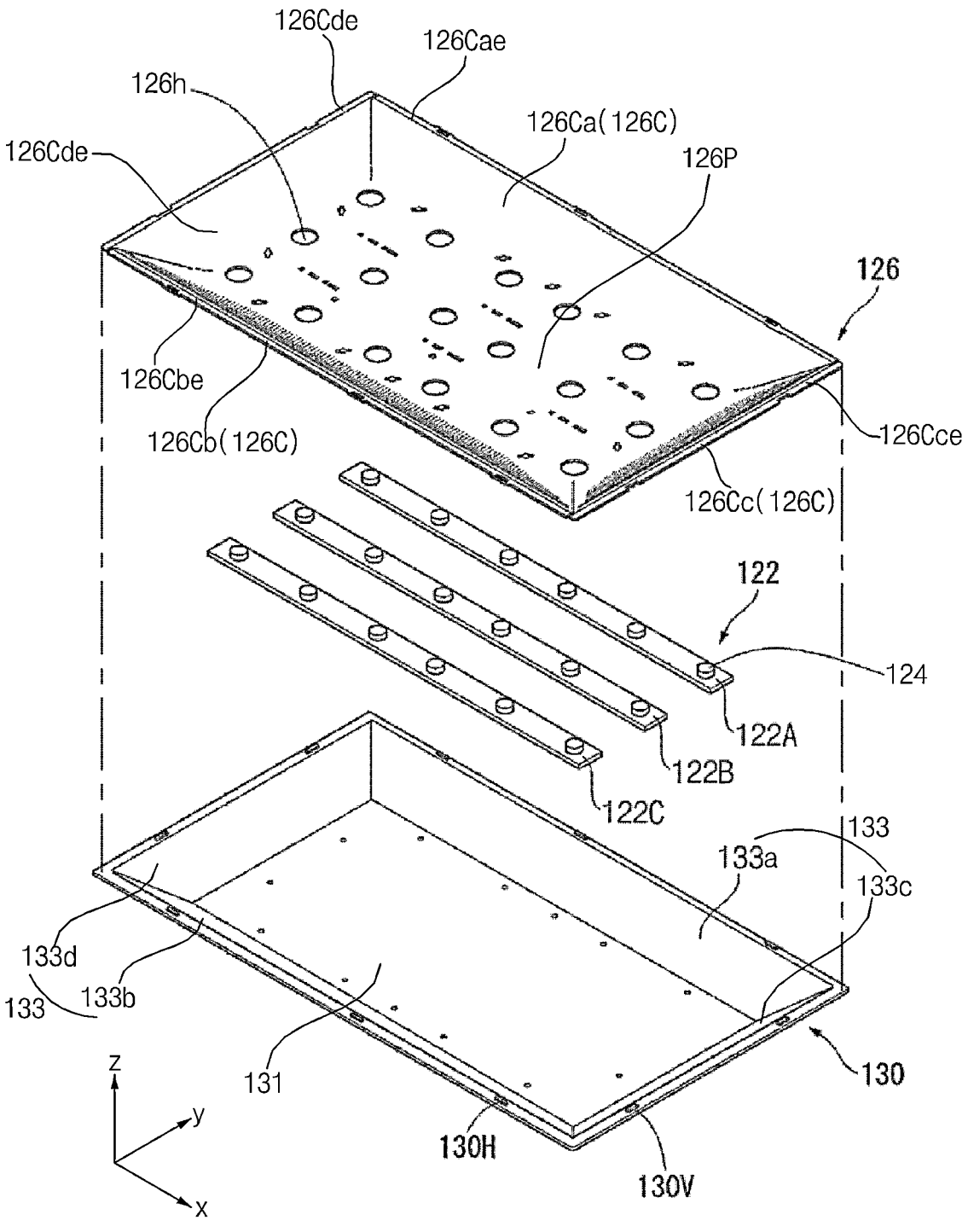
Figure 5:
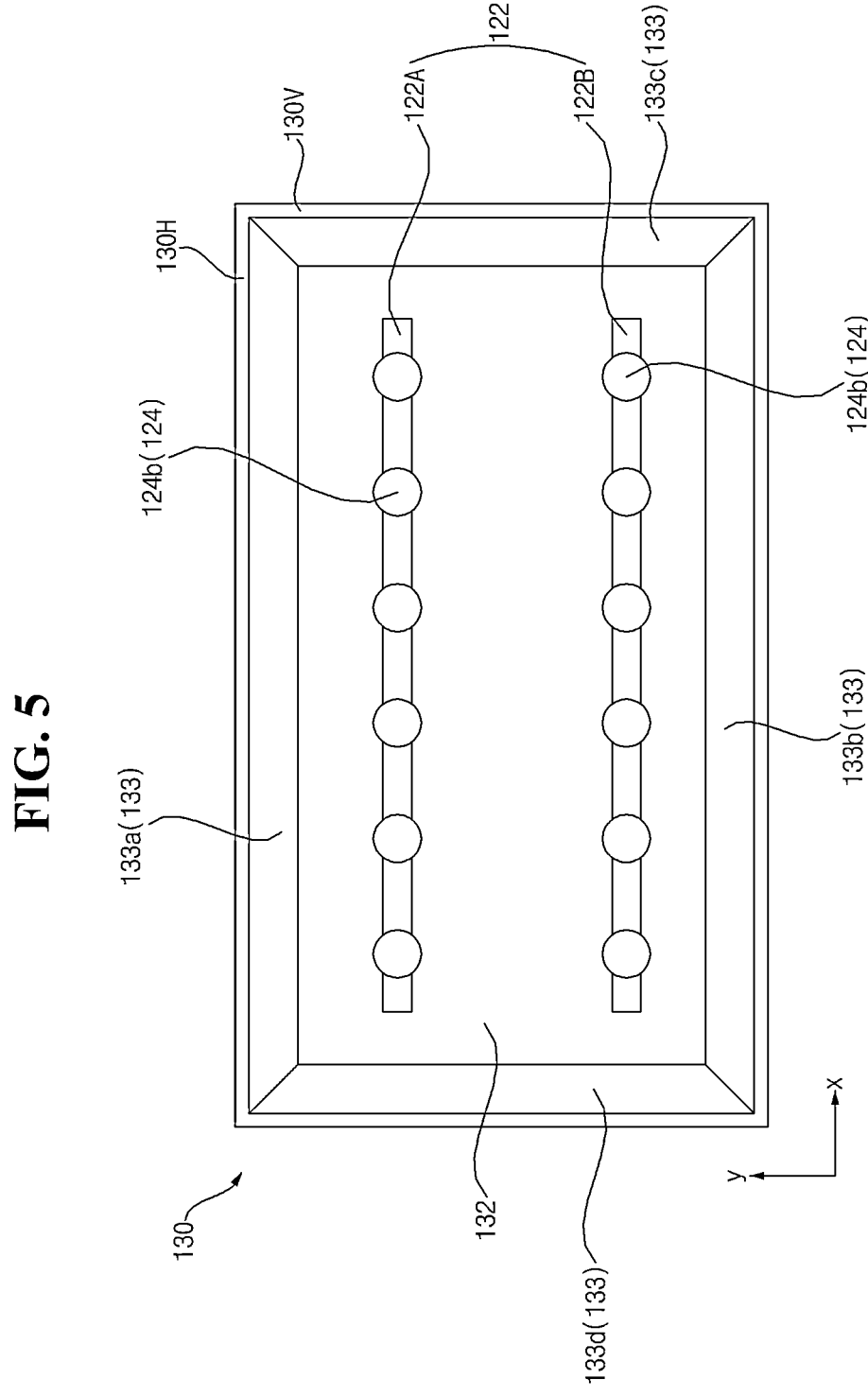

Referring to FIGS. 4 and 5, the substrate 122 may include a plurality of bars spaced apart from each other. In an example, the substrate 122 may include three bars 122A, 122B, and 122C (refer to FIG. 4). In another example, the substrate 122 may include two bars 122A and 122B (refer to FIG. 5). In still another example, the substrate 122 may include at least one plate-shaped substrate or at least one fork-shaped substrate.

The frame 130 may be generally formed in a rectangular tray shape. The frame 130 may include a central portion 131, side portions 133, and seating portions 130H and 130V.

The central portion 131 may be a rectangular plate, and the substrate 122 may be coupled to the front surface of the central portion 131. The central portion 131 may be referred to as a base 131.

The side portions 133 may extend obliquely forward from the edge of the central portion 131. The side portions 133 may be referred to as chamfer portions 133. A first side portion 133*a* may extend obliquely forward from the upper side of the central portion 131. An angle between the first side portion 133*a* and the front surface of the central portion 131 may be an obtuse angle. A second side portion 133*b* may extend obliquely forward from the lower side of the central portion 131. An angle between the second side portion 133*b* and the front surface of the central portion 131 may be an obtuse angle. A third side portion 133*c* may extend obliquely forward from the left side of the central portion 131. An angle between the third side portion 133*c* and the front surface of the central portion 131 may be an obtuse angle. A fourth side portion 133*d* may extend obliquely forward from the right side of the central portion 131. The first to fourth side portions 133*a*, 133*b*, 133*c*, and 133*d* may be connected to each other.

The seating portions 130H and 130V may extend from ends of the side portions 133 in a direction parallel to the central portion 131. A vertical portion 130V may extend in the vertical direction (i.e., upward-downward direction), and may form a left side and a right side of the frame 130. A horizontal portion 130H may extend in the horizontal direction (i.e., leftward-rightward direction), and may form an upper side and a lower side of the frame 130.

The reflective sheet 126 may cover the substrate 122, and the light assemblies 124 on the substrate 122 may be located in the holes 126*h* in the reflective sheet 126. The reflective sheet 126 may have a shape corresponding to the frame 130. The reflective sheet 126 may include a central portion 126P and side portions 126C. The central portion 126P may have a rectangular sheet shape, and the side portions 126C may be obliquely bent forward from the edge of the central portion 126P. The central portion 126P may have a shape corresponding to the central portion 131, and the substrate 122 may be covered by the central portion 126P. The central portion 126P may be referred to as a base 126P, and the side portions 126C may be referred to as chamfer portions 126C.

A first side portion 126Ca may be obliquely bent forward from the upper side of the central portion 126P. The first side portion 126Ca may face the first side portion 133*a*, and a part 126Cae of the first side portion 126Ca may be bent so as to be seated on the horizontal portion 130H extending from the first side portion 133*a*. A second side portion 126Cb may be obliquely bent forward from the lower side of the central portion 126P. The second side portion 126Cb may face the second side portion 133*b*, and a part 126Cbe of the second side portion 126Cb may be bent so as to be seated on the horizontal portion 130H extending from the second side portion 133*b*. A third side portion 126Cc may be obliquely bent forward from the left side of the central portion 126P. The third side portion 126Cc may face the third side portion 133*c*, and a part 126Cce of the third side portion 126Cc may be bent so as to be seated on the vertical portion 130V extending from the third side portion 133*c*. A fourth side portion 126Cd may be obliquely bent forward from the right side of the central portion 126P. The fourth side portion 126Cd may face the fourth side portion 133d, and a part 126Cde of the fourth side portion 126Cd may be bent so as to be seated on the vertical portion 130V extending from the fourth side portion 133d.

Figure 6:
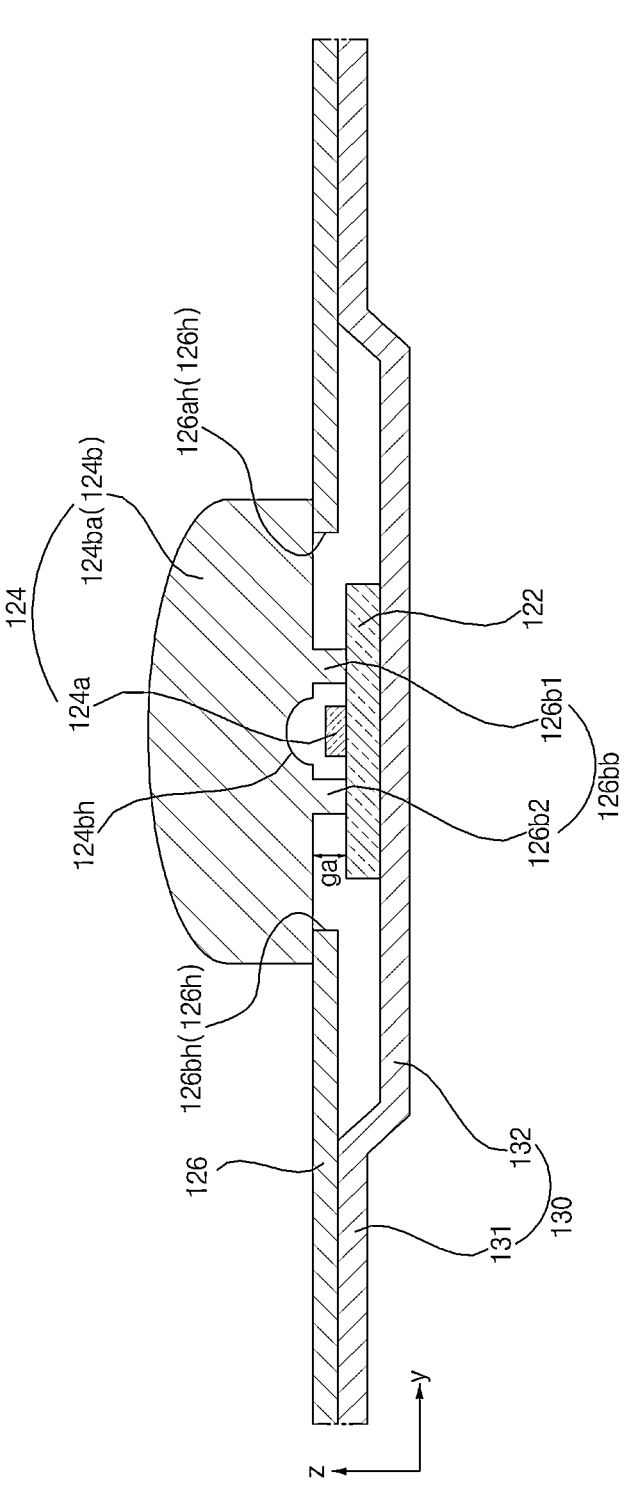
Figure 7:
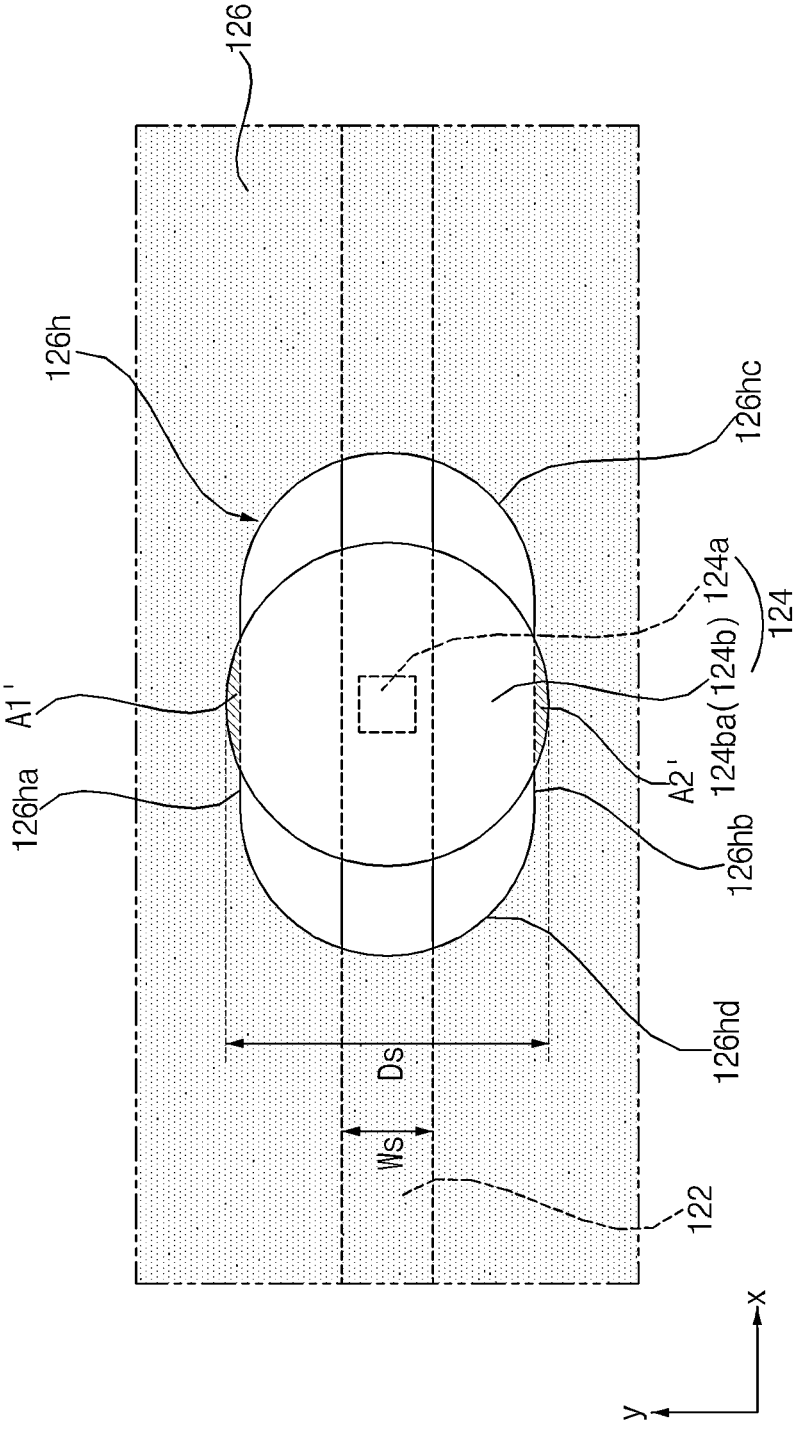

Referring to FIGS. 6 and 7, a depressed portion 132 may be formed by pressing the front surface of the central portion 131 in the backward direction. The substrate 122 may be located on the depressed portion 132.

The light assembly 124 may include a light source 124a providing light and a lens 124b covering the light source 124a. The light source 124a may be mounted on the front surface of the substrate 122. The lens 124b may include a body 124ba and legs 124bb. The body 124ba may have a dome or hemispherical shape, and the rear surface of the body 124ba may be spaced forward from the front surface of the substrate 122 (refer to a gap ga in FIG. 6). The legs 124bb may protrude from the rear surface of the body 124ba toward the substrate 122, and may be coupled to the substrate 122. For example, a first leg 124b1, a second leg 124b2, a third leg 124b3, and a fourth leg 124b4 may be located at the vertices of a rectangle (refer to FIG. 19). Among the first to fourth legs 124b1, 124b2, 124b3, and 124b4, two legs may be inserted into or penetrate the substrate 122, and the remaining two legs may be coupled or bonded to the front surface of the substrate 122.

Accordingly, the lens 124b covering the light source 124a may be coupled to the substrate 122. A groove 124bh may be formed in the rear surface of the body 124ba of the lens 124b, and may face the light source 124a. The diameter Ds of the body 124ba of the lens 124b may be greater than the width Ws of the bar-shaped substrate 122. In this case, in the forward-backward direction, a portion of the body 124ba may overlap the substrate 122, but the remaining portion of the body 124ba may not overlap the substrate 122.

The reflective sheet 126 may be coupled to the lens 124b after the lens 124b is coupled to the substrate 122 on the frame 130. To this end, a user may press the reflective sheet 126 above the lens 124b toward the frame 130 in a state of aligning the hole 126h in the reflective sheet 126 with the lens 124b. Here, a portion of the border of the hole 126h may overlap the lens 124b. As the user presses the reflective sheet 126 toward the frame 130, a portion of the reflective sheet 126 may be bent by the lens 124b, and may be spread back in the gap ga. Accordingly, the reflective sheet 126 may be located on the central portion 131 of the frame 130, and a portion of the front surface of the reflective sheet 126 may be caught by the rear surface of the lens 124b, whereby the reflective sheet 126 may be located between the lens 124b and the frame 130.

For example, the hole 126h in the reflective sheet 126 may have a slot shape elongated in the horizontal direction or the vertical direction. The substrate 122 may have a long bar shape, and the hole 126h may be a slot elongated in the longitudinal direction of the substrate 122. The border of the hole 126h may include two straight sections 126ha and 126hb and two curved sections 126hc and 126hd. The straight sections 126ha and 126hb may extend in the longitudinal direction of the hole 126h, and the curved sections 126hc and 126hd may form both ends of the hole 126h.

A first straight section 126ha may be a straight line extending in the longitudinal direction of the hole 126h. The first straight section 126ha may extend along one long side (e.g., upper side) of the substrate 122 from the rear side of the body 124ba of the lens 124b, and may be spaced apart from the long side of the substrate 122 in the width direction of the substrate 122 (e.g., upward direction).

A second straight section 126hb may be a straight line extending in the longitudinal direction of the hole 126h. The second straight section 126hb may extend along the opposite long side (e.g., lower side) of the substrate 122 from the rear side of the body 124ba of the lens 124b, and may be spaced apart from the opposite long side of the substrate 122 in the width direction of the substrate 122 (e.g., downward direction).

The first and second straight sections 126ha and 126hb may be opposite each other with respect to the lens 124b. The first and second straight sections 126ha and 126hb may have the same length, and may be parallel to each other.

A first curved section 126hc may connect one end (e.g., left end) of the first straight section 126ha to one end (e.g., left end) of the second straight section 126hb, and may be convex in a direction opposite the direction toward the lens 124b (e.g., in the leftward direction). A horizontal distance between the light source 124a and the first curved section 126hc may be longer than a horizontal distance between the light source 124a and the surface of the lens 124b. Alternatively, the minimum value of the horizontal distance between the light source 124a and the first curved section 126hc may be equal to the minimum value of the horizontal distance between the light source 124a and the surface of the lens 124b.

A second curved section 126hd may connect the other end (e.g., right end) of the first straight section 126ha to the other end (e.g., right end) of the second straight section 126hb, and may be convex in a direction opposite the direction toward the lens 124b (e.g., in the rightward direction). A horizontal distance between the light source 124a and the second curved section 126hd may be longer than the horizontal distance between the light source 124a and the surface of the lens 124b. Alternatively, the minimum value of the horizontal distance between the light source 124a and the second curved section 126hd may be equal to the minimum value of the horizontal distance between the light source 124a and the surface of the lens 124b.

The first and second curved sections 126hc and 126hd may be opposite each other with respect to the lens 124b. The first and second curved sections 126hc and 126hd may have the same curvature.

In this case, at least a portion of the first straight section 126ha may be located between the surface of the body 124ba of the lens 124b and one long side (e.g., upper side) of the substrate 122. A portion of the rear surface of the body 124ba may overlap the front surface of a portion of the reflective sheet 126 that forms the first straight section 126ha in the forward-backward direction, and may be referred to as a first area A1'. The first area A1' may be adjacent to or in contact with the front surface of the reflective sheet 126, and may be formed in the shape of a segment of a circle.

In addition, at least a portion of the second straight section 126hb may be located between the surface of the body 124ba of the lens 124b and the opposite long side (e.g., lower side) of the substrate 122. A portion of the rear surface of the body 124ba may overlap the front surface of a portion of the reflective sheet 126 that forms the second straight section 126hb in the forward-backward direction, and may be referred to as a second area A2'. The second area A2' may be adjacent to or in contact with the front surface of the reflective sheet 126, and may be formed in the shape of a segment of a circle.

Accordingly, a portion of the front surface of the reflective sheet 126 is caught by the rear surface of the lens 124*b*, whereby the reflective sheet 126 may be located between the lens 124*b* and the frame 130. However, since the reflective sheet 126 is caught only by the edge area corresponding to the segment of a circle of the body 124*ba* of the lens 124*b*, there may occur a problem in that the reflective sheet 126 is separated from the lens 124*b* due to impact or vibration applied to the display device.

Figure 8:
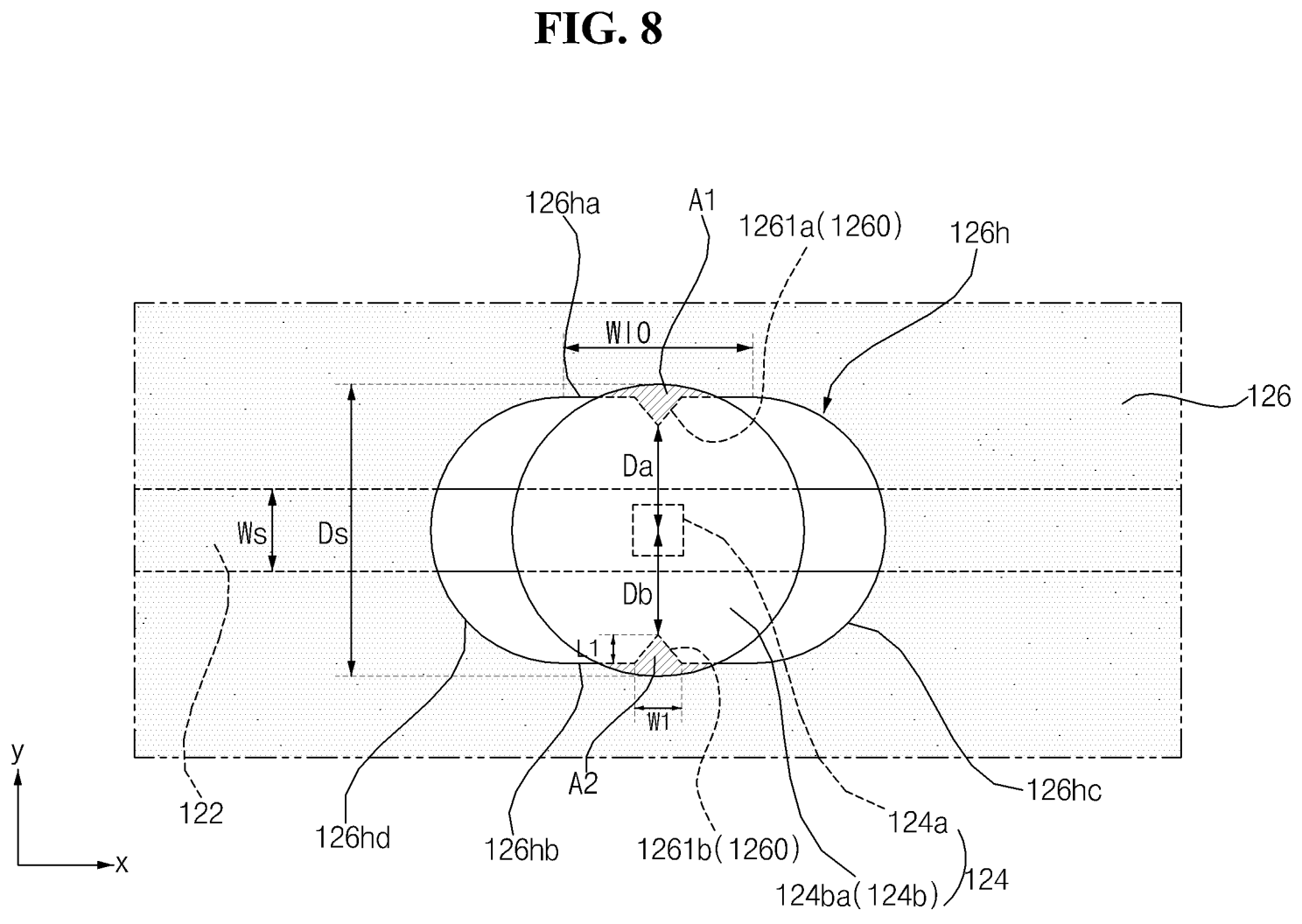
Figure 9:
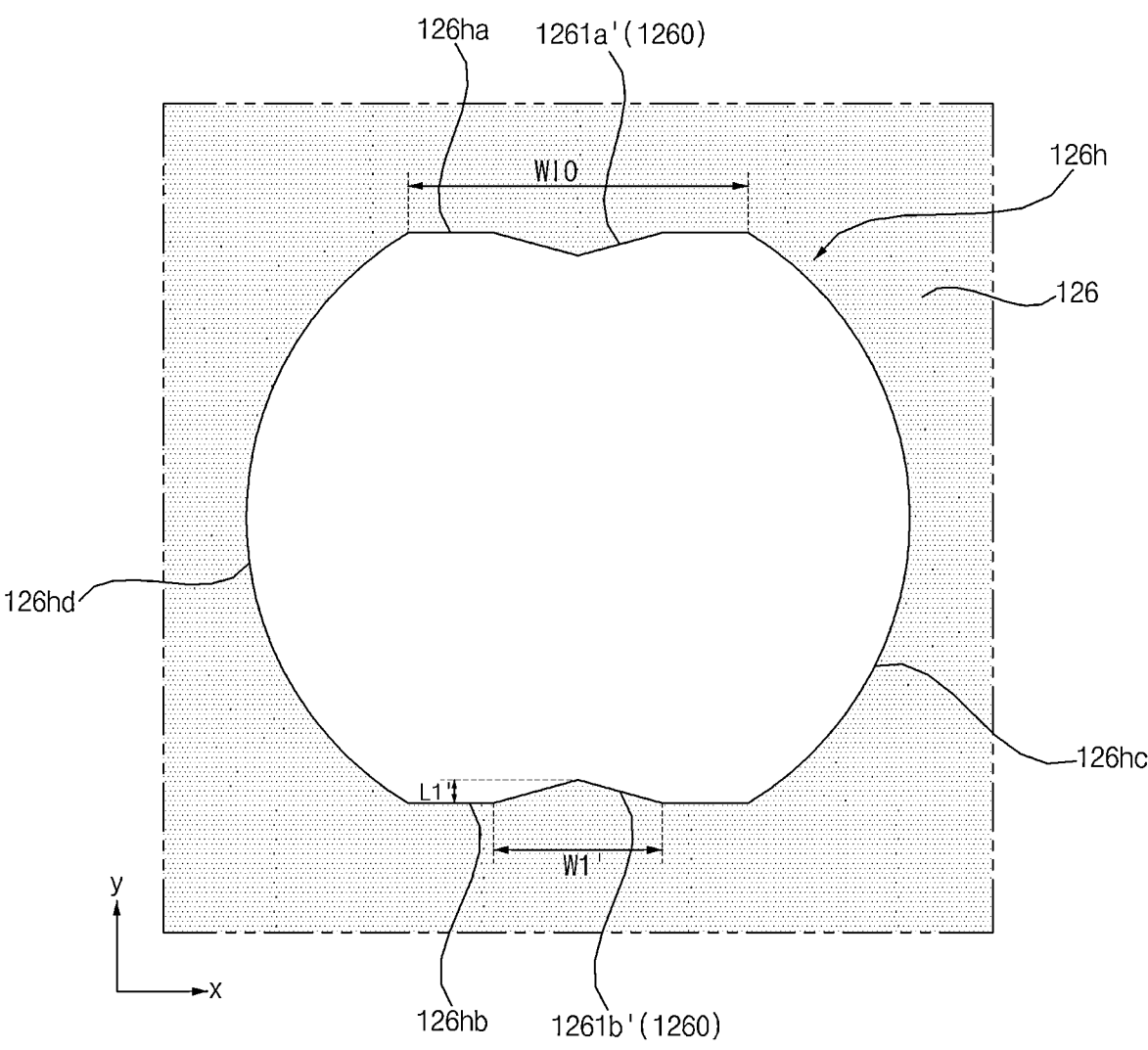

Referring to FIGS. 8 and 9, the reflective sheet 126 may include protrusions 1260 formed on the straight sections 126*ha* and 126*hb*.

A first protrusion 1261*a* (1261*a'*) may protrude from the first straight section 126*ha* toward the inside of the hole 126*h* in the reflective sheet 126. The first protrusion 1261*a* (1261*a'*) may face the center of the hole 126*h*. The first protrusion 1261*a* (1261*a'*) may face the light source 124*a*. The first protrusion 1261*a* (1261*a'*) may form a portion of the border of the hole 126*h*.

A second protrusion 1261*b* (1261*b'*) may protrude from the second straight section 126*hb* toward the inside of the hole 126*h* in the reflective sheet 126. The second protrusion 1261*b* (1261*b'*) may face the center of the hole 126*h*. The second protrusion 1261*b* (1261*b'*) may face the light source 124*a*. The second protrusion 1261*b* (1261*b'*) may form a portion of the border of the hole 126*h*.

Each of the protrusions 1260 may have a predetermined width W1 (W1') and a predetermined length L1 (L1'). Here, the length L1 (L1') may be a length (depth) by which each of the protrusions 1260 protrudes from a respective one of the first straight section 126*ha* and the second straight section 126*hb*.

The protrusions 1260 may be spaced apart from the light source 124*a*. The protrusions 1260 may be spaced apart from the bar-shaped substrate 122 in the width direction of the substrate 122. That is, in the forward-backward direction, the protrusions 1260 may not overlap the bar-shaped substrate 122. The first protrusion 1261*a* (1261*a'*) may be spaced upward from the upper side of the substrate 122, and the second protrusion 1261*b* (1261*b'*) may be spaced downward from the lower side of the substrate 122. For example, the length L1 (L1') of each of the protrusions 1260 may be 5% or more of the diameter Ds of the body 124*ba* of the lens 124*b*. For example, distances Da and Db (refer to FIG. 8) between the protrusions 1260 and the center of the light source 124*a* may be greater than half the radius of the body 124*ba* of the lens 124*b*.

Accordingly, the reflective sheet 126 including the protrusions 1260 may be stably caught by the rear surface of the body 124*ba* of the lens 124*b*. That is, even when impact or vibration is applied to the display device, the reflective sheet 126 may not be easily separated from the lens 124*b*. Further, deterioration in the light distribution function of the lens 124*b* due to the protrusions 1260 may be minimized.

The width of each of the protrusions 1260 may be less than the length of a respective one of the first straight section 126*ha* and the second straight section 126*hb*. The width W1 (W1') of the first protrusion 1261*a* (1261*a'*) may be 10% to 25% of the length W10 of the first straight section 126*ha*. The width W1 (W1') of the second protrusion 1261*b* (1261*b'*) may be 10% to 25% of the length W10 of the second straight section 126*hb*. If the width W1 (W1') is less than 10% of the length W10, it may be difficult not only to form the protrusions 1260, but also to ensure stable coupling of the reflective sheet 126 including the protrusions 1260 to the rear surface of the body 124*ba* of the lens 124*b*. If the width W1 (W1') exceeds 25% of the length W10, it may be difficult for the user to perform a coupling task of pressing the reflective sheet 126 including the protrusions 1260 above the lens 124*b* toward the frame 130.

Accordingly, the reflective sheet 126 including the protrusions 1260 may be easily held between the frame 130 and the body 124*ba* of the lens 124*b*, and may be stably caught by the rear surface of the body 124*ba*.

Referring to FIG. 8, the protrusions 1261*a* and 1261*b* may be, for example, triangular protrusions having relatively small widths. The first protrusion 1261*a* and the second protrusion 1261*b* may be symmetrical to each other with respect to the center of the hole 126*h* in the reflective sheet 126. Meanwhile, any one of the first protrusion 1261*a* and the second protrusion 1261*b* may be omitted.

Referring to FIG. 9, the protrusions 1261*a'* and 1261*b'* may be, for example, triangular protrusions having relatively large widths. The width W1' of each of the protrusions 1261*a'* and 1261*b'* may be larger than the width W1 of each of the protrusions 1261*a* and 1261*b* (refer to FIG. 8). The length L1' of each of the protrusions 1261*a'* and 1261*b'* may be equal to or different from the length L1 of each of the protrusions 1261*a* and 1261*b* (refer to FIG. 8). The first protrusion 1261*a'* and the second protrusion 1261*b'* may be symmetrical to each other with respect to the center of the hole 126*h* in the reflective sheet 126. Meanwhile, any one of the first protrusion 1261*a'* and the second protrusion 1261*b'* may be omitted.

As described above, the triangular protrusions 1260 may have various widths and lengths.

Figure 10:
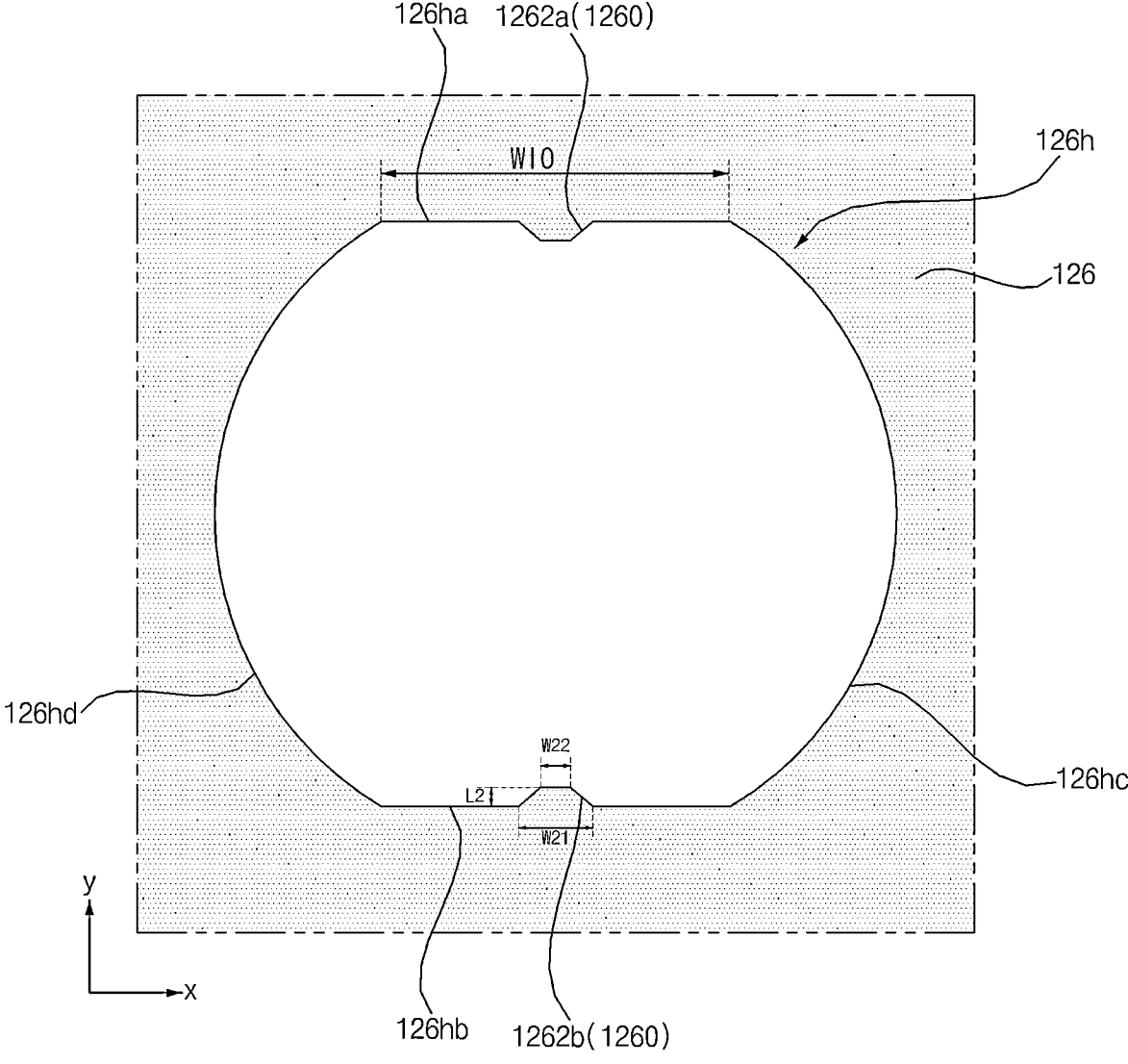
Figure 11:
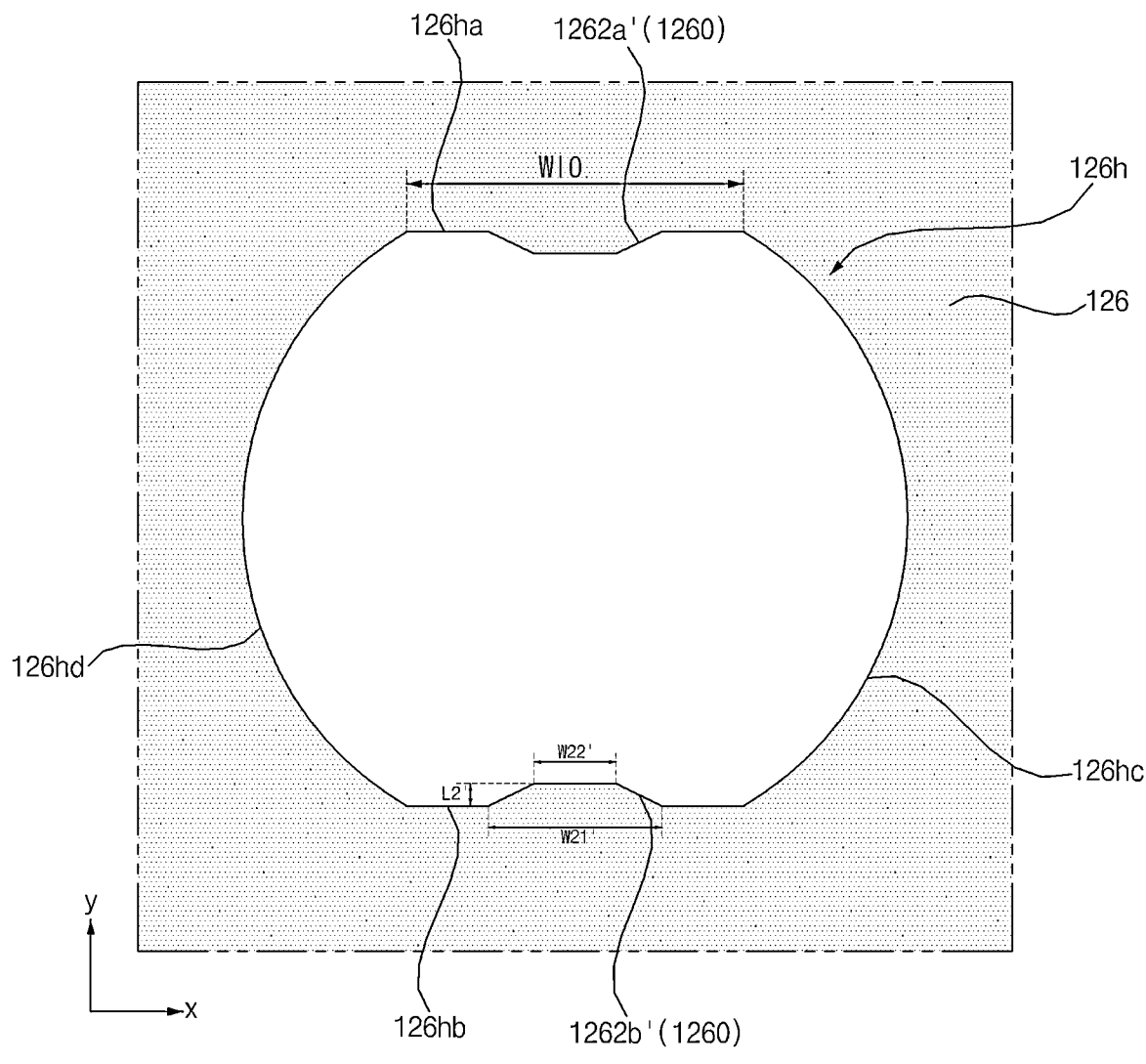

Referring to FIGS. 10 and 11, the protrusions 1260 may have a trapezoidal shape. The short side of the trapezoid may face the inside of the hole 126*h* in the reflective sheet 126, and the long side of the trapezoid may be connected to the straight section of the hole 126*h*.

Referring to FIG. 10, the protrusions 1262*a* and 1262*b* may be, for example, trapezoidal protrusions having a relatively small width. The first protrusion 1262*a* may protrude from the first straight section 126*ha* toward the inside of the hole 126*h* in the reflective sheet 126. The second protrusion 1262*b* may protrude from the second straight section 126*hb* toward the inside of the hole 126*h* in the reflective sheet 126. The first protrusion 1262*a* and the second protrusion 1262*b* may be symmetrical to each other with respect to the center of the hole 126*h* in the reflective sheet 126. Meanwhile, any one of the first protrusion 1262*a* and the second protrusion 1262*b* may be omitted.

Referring to FIG. 11, the protrusions 1262*a'* and 1262*b'* may be, for example, trapezoidal protrusions having a relatively large width. The first protrusion 1262*a'* may protrude from the first straight section 126*ha* toward the inside of the hole 126*h* in the reflective sheet 126. The second protrusion 1262*b'* may protrude from the second straight section 126*hb* toward the inside of the hole 126*h* in the reflective sheet 126. The first protrusion 1262*a'* and the second protrusion 1262*b'* may be symmetrical to each other with respect to the center of the hole 126*h* in the reflective sheet 126. Meanwhile, any one of the first protrusion 1262*a'* and the second protrusion 1262*b'* may be omitted.

The width W21' of the long side and the width W22' of the short side of each of the protrusions 1262*a'* and 1262*b'* may be larger than the width W21 of the long side and the width W22 of the short side of each of the protrusions 1262*a* and 1262*b* (refer to FIG. 10). The length L2' of each of the protrusions 1262*a'* and 1262*b'* may be equal to or different from the length L2 of each of the protrusions 1262*a* and 1262*b* (refer to FIG. 10).

As described above, the trapezoidal protrusions 1260 may have various widths and lengths.

Referring again to FIGS. 8 to 11, the protrusions 1260 may be triangular protrusions or trapezoidal protrusions. Alternatively, the protrusions 1260 may be polygonal protrusions other than triangular or trapezoidal protrusions, for example, rectangular protrusions, pentagonal protrusions, or hexagonal protrusions.

Figure 12:
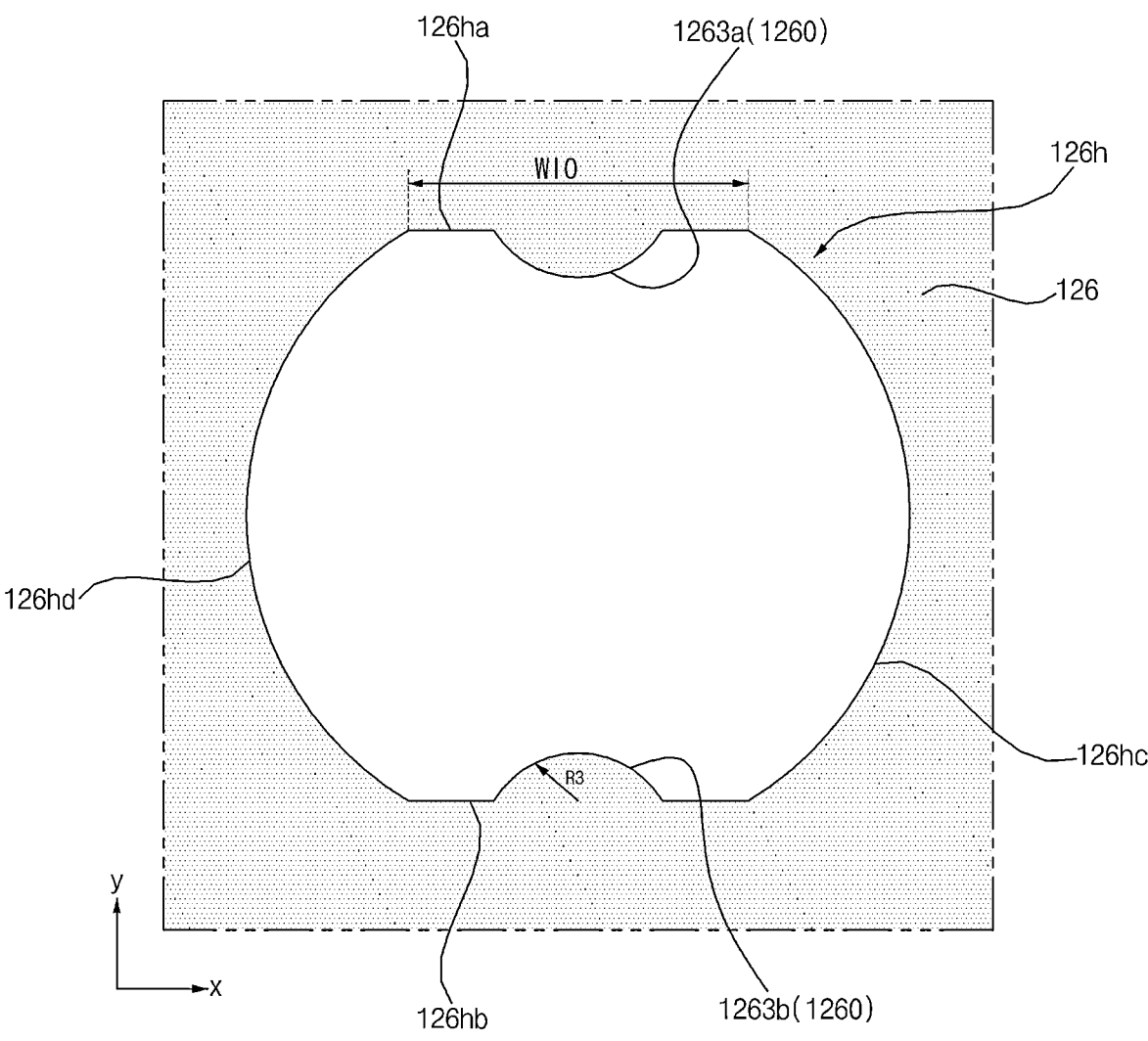

Referring to FIG. 12, the end of each of the protrusions 1260 may be rounded. Alternatively, a portion of each of the protrusions 1260 having the rounded ends may be formed to be sharp. The protrusions 1260 may be formed in the shape of a semicircle or a segment of a circle having a predetermined radius of curvature R3. The protrusions 1260 may have various radii of curvature R3 or curved shapes.

A first protrusion 1263*a* may protrude from the first straight section 126*ha* toward the inside of the hole 126*h* in the reflective sheet 126. The first protrusion 1263*a* may be convex toward the hole 126*h*.

A second protrusion 1263*b* may protrude from the second straight section 126*hb* toward the inside of the hole 126*h* in the reflective sheet 126. The second protrusion 1263*b* may be convex toward the hole 126*h*.

The first protrusion 1263*a* and the second protrusion 1263*b* may be symmetrical to each other with respect to the center of the hole 126*h* in the reflective sheet 126. Meanwhile, any one of the first protrusion 1263*a* and the second protrusion 1263*b* may be omitted.

Figure 13:
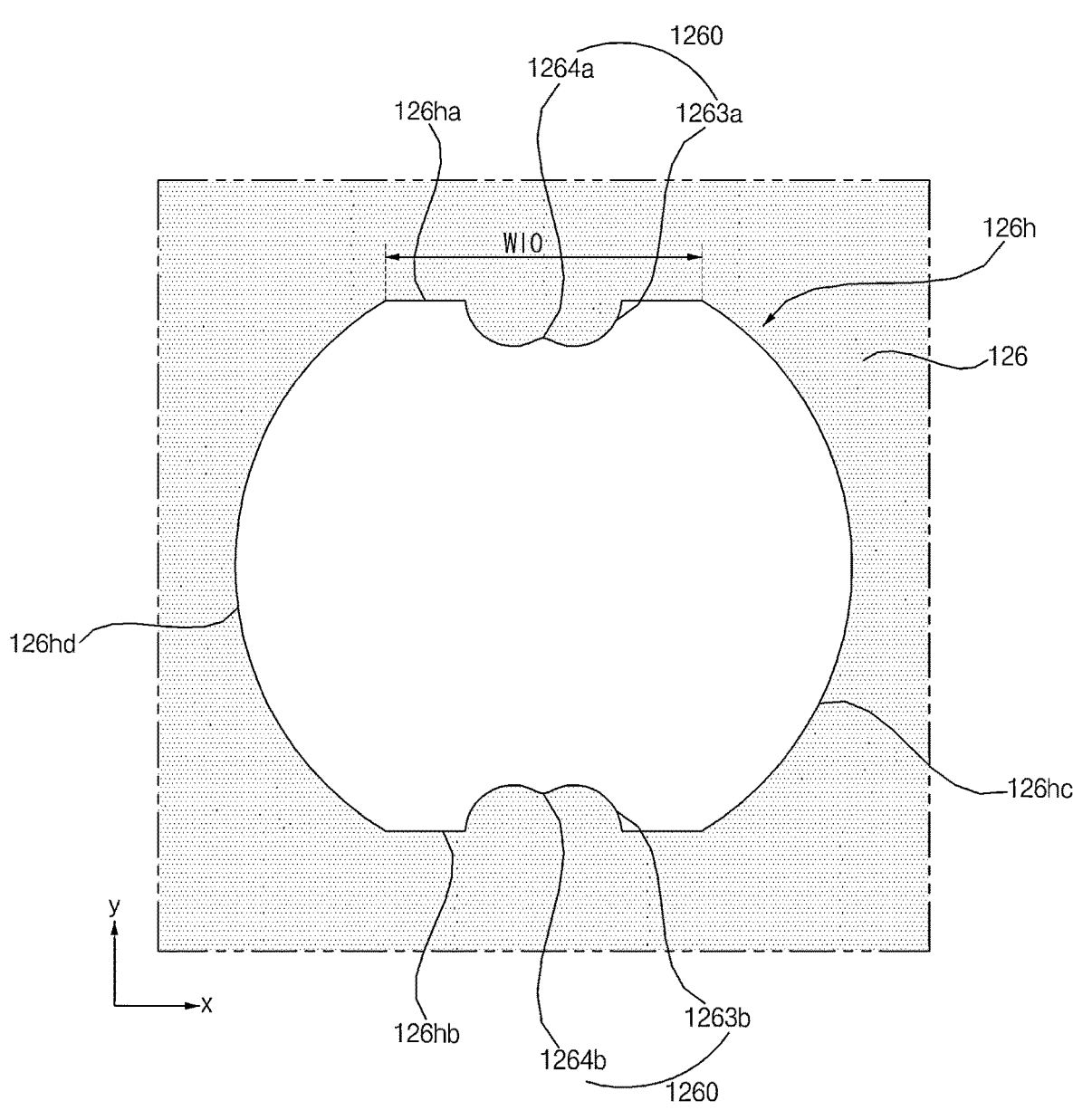

Referring to FIG. 13, a groove may be formed in the end of each of the protrusions 1260. The groove may be referred to as a notch. The groove may be formed to be rounded or angled.

A first groove 1264*a* may be formed in the end of the first protrusion 1263*a*. The first groove 1264*a* may be formed in the central portion of the end of the first protrusion 1263*a*. The first groove 1264*a* may face the center of the hole 126*h* in the reflective sheet 126.

A second groove 1264*b* may be formed in the end of the second protrusion 1263*b*. The second groove 1264*b* may be formed in the central portion of the end of the second protrusion 1263*b*. The second groove 1264*b* may face the center of the hole 126*h* in the reflective sheet 126.

The first groove 1264*a* and the second groove 1264*b* may be symmetrical to each other with respect to the center of the hole 126*h* in the reflective sheet 126. Meanwhile, any one of the first groove 1264*a* and the second groove 1264*b* may be omitted.

Figure 14:
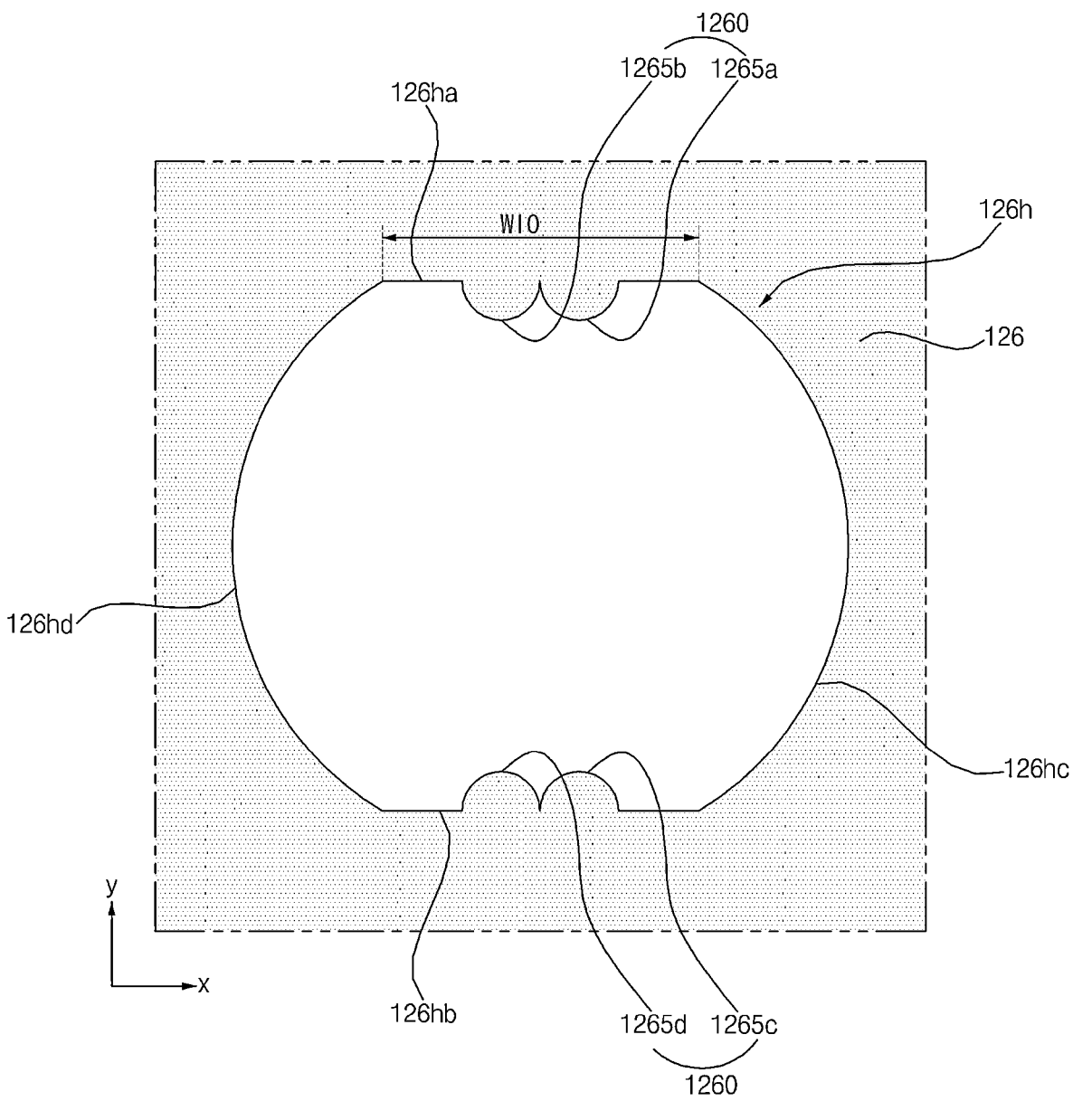

Referring to FIG. 14, a plurality of protrusions 1260 may be formed on each of the first straight section 126*ha* and the second straight section 126*hb*. That is, the number of protrusions 1260 formed on the first straight section 126*ha* may be at least two, and the number of protrusions 1260 formed on the second straight section 126*hb* may also be at least two. Alternatively, the number of protrusions 1260 formed on one of the first straight section 126*ha* and the second straight section 126*hb* may be one, and the number of protrusions 1260 formed on the other may be at least two.

A first protrusion 1265*a* and a second protrusion 1265*b* may protrude from the first straight section 126*ha* toward the inside of the hole 126*h* in the reflective sheet 126. The first protrusion 1265*a* and the second protrusion 1265*b* may be arranged along the first straight section 126*ha*. Meanwhile, three or more protrusions 1260 may be arranged along the first straight section 126*ha*. The protrusions 1265*a* and 1265*b* may be adjacent to or contiguous with each other. The protrusions 1265*a* and 1265*b* may be formed in a rounded shape, such as a semicircular shape (refer to FIG. 14), or may be formed in an angled shape, such as a triangular shape (refer to FIGS. 8 and 9) or a trapezoidal shape (refer to FIGS. 10 and 11). Alternatively, one of the protrusions 1265*a* and 1265*b* may be formed to be rounded, and the other may be formed to be angled. Furthermore, grooves 1264*a* and 1264*b* (refer to FIG. 13) may be formed in the ends of the first protrusion 1265*a* and the second protrusion 1265*b*.

A third protrusion 1265*c* and a fourth protrusion 1265*d* may protrude from the second straight section 126*hb* toward the inside of the hole 126*h* in the reflective sheet 126. The third protrusion 1265*c* and the fourth protrusion 1265*d* may be arranged along the second straight section 126*hb*. Meanwhile, three or more protrusions 1260 may be arranged along the second straight section 126*hb*. The protrusions 1265*c* and 1265*d* may be adjacent to or contiguous with each other. The protrusions 1265*c* and 1265*d* may be formed in a rounded shape, such as a semicircular shape (refer to FIG. 14), or may be formed in an angled shape, such as a triangular shape (refer to FIGS. 8 and 9) or a trapezoidal shape (refer to FIGS. 10 and 11). Alternatively, one of the protrusions 1265*c* and 1265*d* may be formed to be rounded, and the other may be formed to be angled. Furthermore, grooves 1264*a* and 1264*b* (refer to FIG. 13) may be formed in the ends of the third protrusion 1265*c* and the fourth protrusion 1265*d*.

The first and second protrusions 1265*a* and 1265*b* and the third and fourth protrusions 1265*c* and 1265*d* may be symmetrical to each other with respect to the center of the hole 126*h* in the reflective sheet 126. Meanwhile, any one of the first to fourth protrusions 1265*a*, 1265*b*, 1265*c*, and 1265*d* may be omitted.

Figure 15:
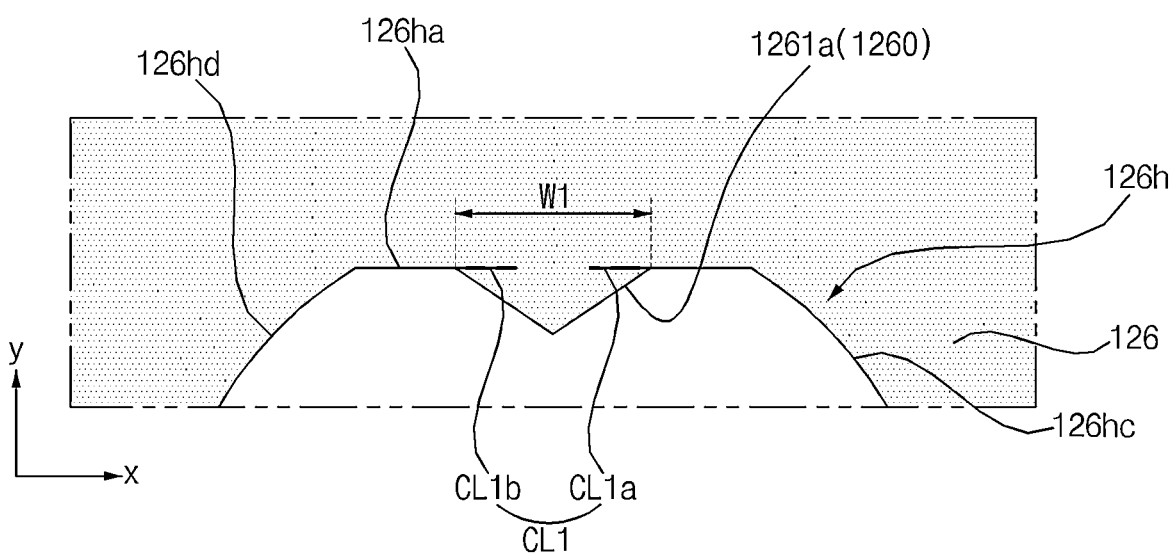

Referring to FIG. 15, cut-lines CL1 may be formed in the boundary between the first straight section 126*ha* and the first protrusion 1261*a*. Portions of the first protrusion 1261*a* that are contiguous with the cut-lines CL1 may be separated from the first straight section 126*ha*. That is, portions of the first protrusion 1261*a* that are contiguous with the cut-lines CL1 may be free from the first straight section 126*ha*.

A first cut-line CL1*a* may be formed to extend from one end of one side (i.e., upper side) of the first protrusion 1261*a* connected to the first straight section 126*ha* toward the other end of the corresponding side. A second cut-line CL1*b* may be formed to extend from the other end of the corresponding side of the first protrusion 1261*a* toward one end of the corresponding side. The first cut-line CL1*a* and the second cut-line CL1*b* may be spaced apart from each other in the longitudinal direction of the first straight section 126*ha*. The first cut-line CL1*a* and the second cut-line CL1*b* may have the same length.

Accordingly, the first protrusion 1261*a* having the cut-lines CL1 may be easily bent from the reflective sheet 126. That is, the user may easily press the reflective sheet 126 including the first protrusion 1261*a* having the cut-lines CL1 above the lens 124*b* toward the frame 130 so that the reflective sheet 126 is held by the rear surface of the body 124*ba* of the lens 124*b* (refer to FIG. 6). The cut-lines CL1 may be formed not only in the boundary between the first protrusion 1261*a* and the first straight section 126*ha* but also in the boundaries between the protrusions 1260 and the straight sections 126*ha* and 126*hb*, which have been described above with reference to FIGS. 8 to 14.

Figure 16:
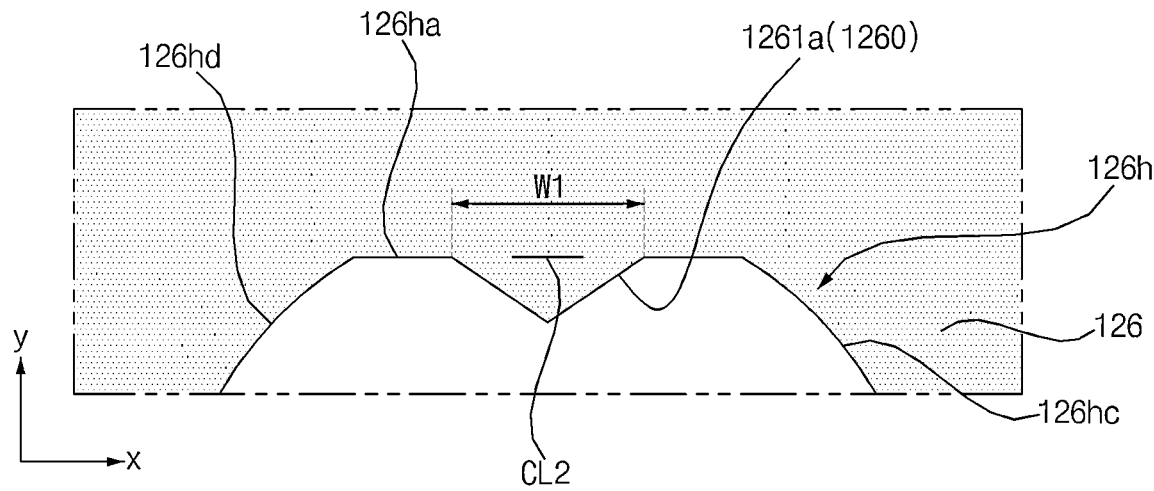

Referring to FIG. 16, a cut-line CL2 may be formed in the boundary between the first straight section 126*ha* and the first protrusion 1261*a*. A portion of the first protrusion 1261*a* that is contiguous with the cut-line CL2 may be separated from the first straight section 126*ha*. That is, a portion of the first protrusion 1261*a* that is contiguous with the cut-line CL2 may be free from the first straight section 126*ha*.

The cut-line CL2 may be formed between two opposite ends of one side (i.e., upper side) of the first protrusion 1261*a* connected to the first straight section 126*ha*, and may be spaced apart from the two opposite ends. That is, the length of the cut-line CL2 may be shorter than the length of the corresponding side of the first protrusion 1261*a*.

Accordingly, the first protrusion 1261*a* having the cut-line CL2 may be easily bent from the reflective sheet 126. That is, the user may easily press the reflective sheet 126 including the first protrusion 1261*a* having the cut-line CL2 above the lens 124*b* toward the frame 130 so that the reflective sheet 126 is held by the rear surface of the body 124*ba* of the lens 124*b* (refer to FIG. 6). The cut-line CL2 may be formed not only in the boundary between the first protrusion 1261*a* and the first straight section 126*ha* but also in the boundaries between the protrusions 1260 and the straight sections 126*ha* and 126*hb*, which have been described above with reference to FIGS. 8 to 14.

Figure 17:
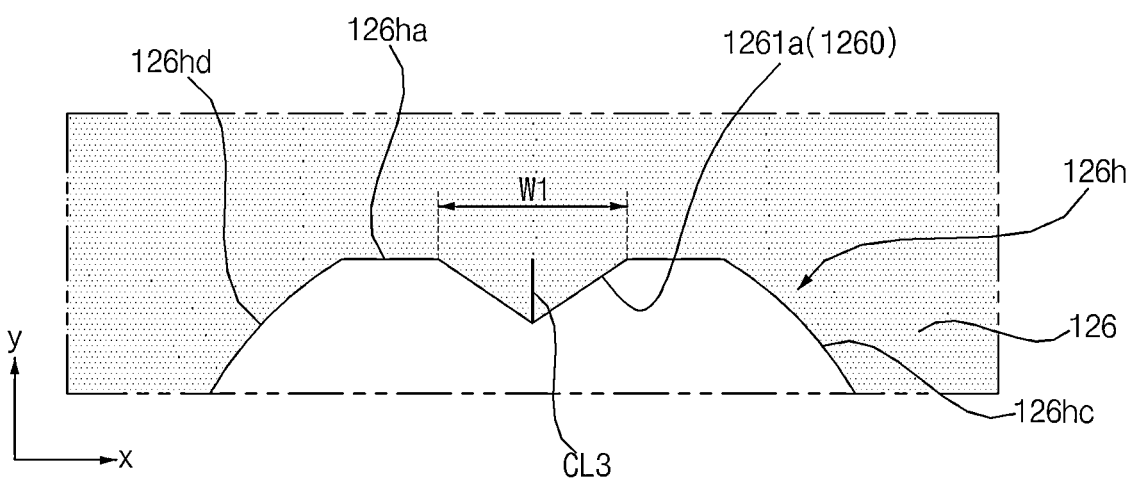

Referring to FIG. 17, a cut-line CL3 may be formed in the first protrusion 1261*a*. The first protrusion 1261*a* may be divided into two portions by the cut-line CL3. That is, the first and second portions of the first protrusion 1261*a* that face each other with respect to the cut-line CL3 may be free from each other.

The cut-line CL3 may be formed to extend along the center line of the first protrusion 1261*a* from the end of the first protrusion 1261*a*. An end of the cut-line CL3 may be adjacent to or contiguous with the boundary between the first straight section 126*ha* and the first protrusion 1261*a*.

Accordingly, the first protrusion 1261*a* having the cut-line CL3 may be easily bent from the reflective sheet 126. That is, the user may easily press the reflective sheet 126 including the first protrusion 1261*a* having the cut-line CL3 above the lens 124*b* toward the frame 130 so that the reflective sheet 126 is held by the rear surface of the body 124*ba* of the lens 124*b* (refer to FIG. 6). The cut-line CL3 may be formed not only in the first protrusion 1261*a* but also in the protrusions 1260 described above with reference to FIGS. 8 to 14.

Figure 18:
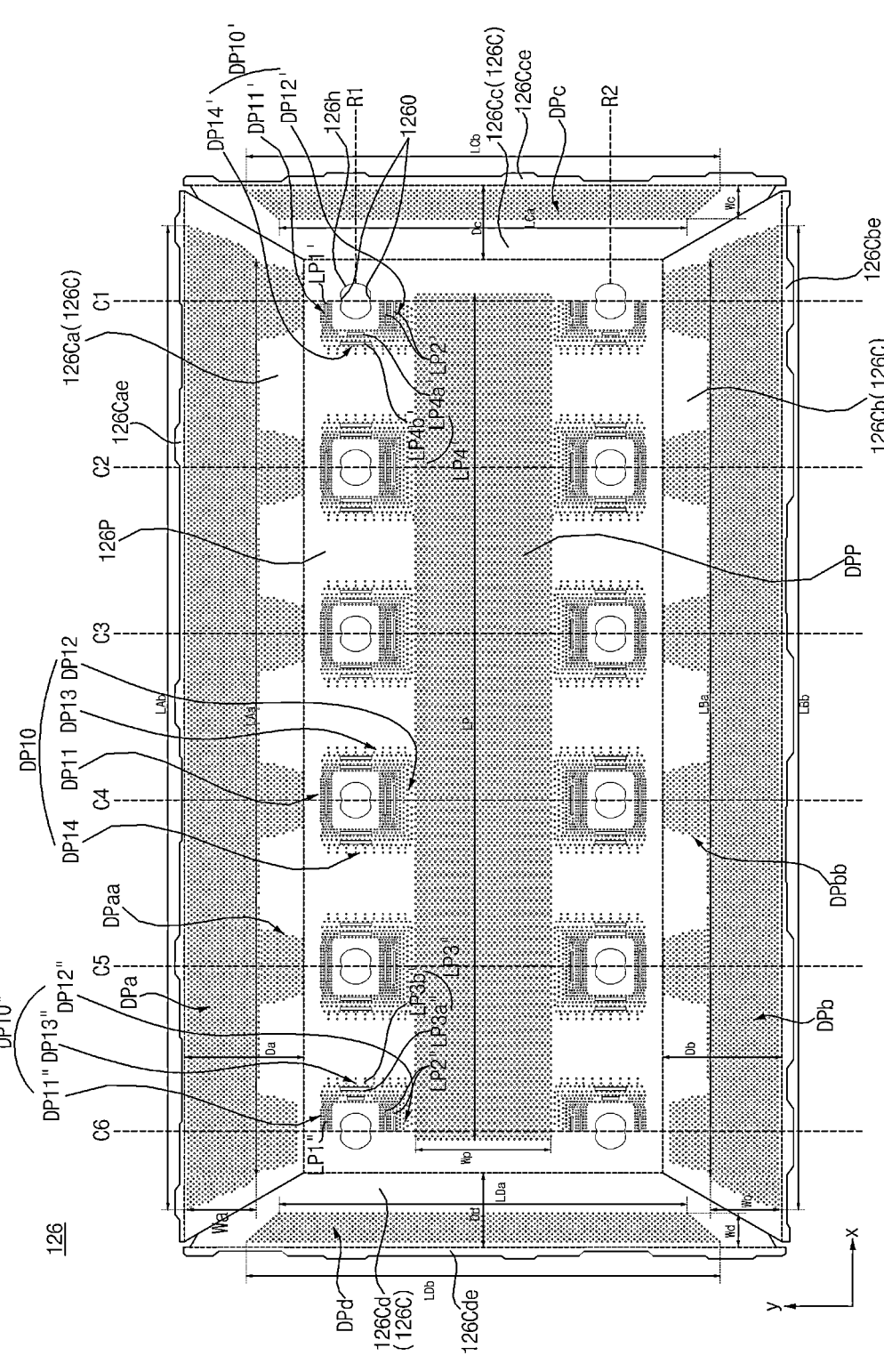
Figure 19:
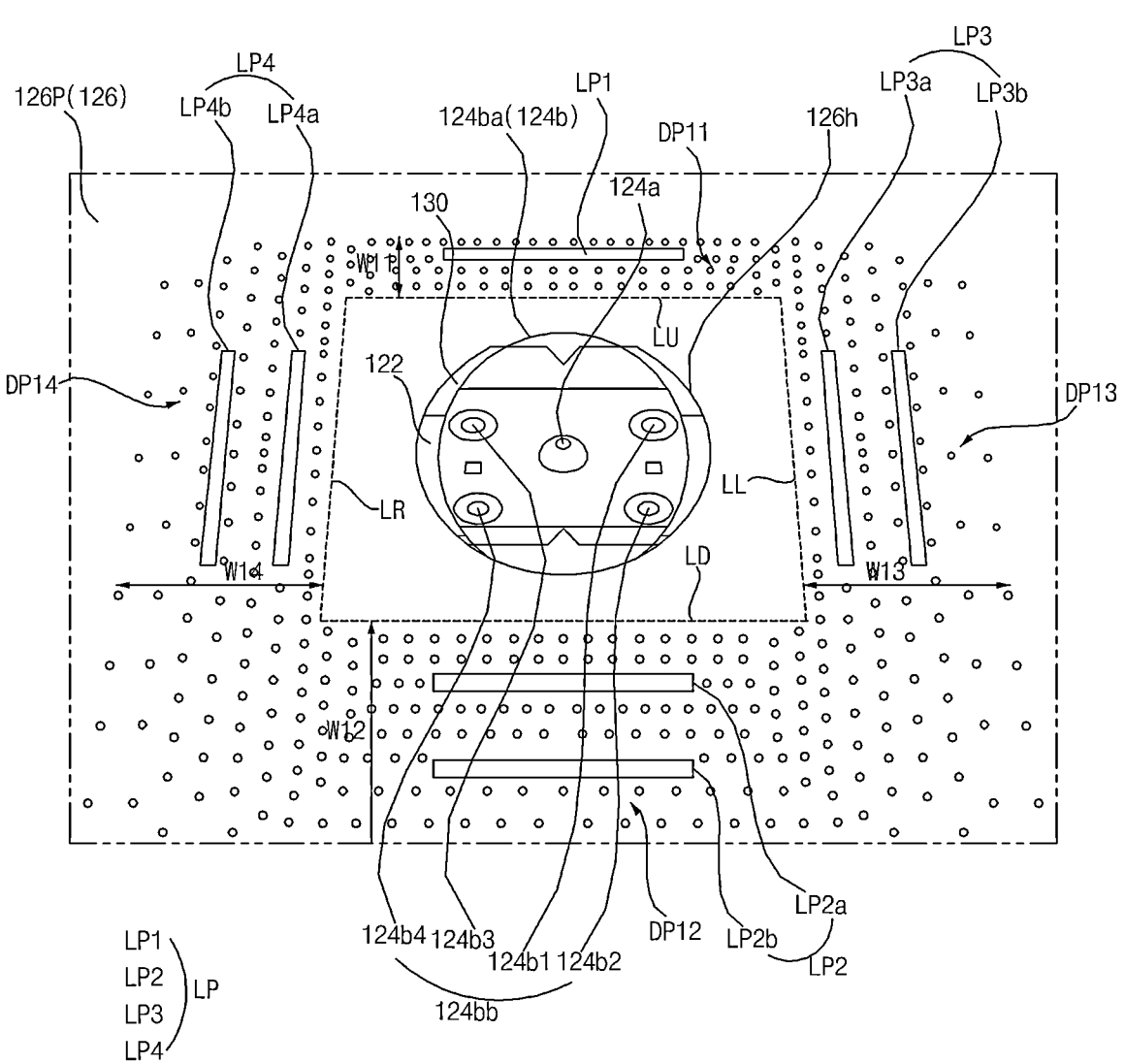

Referring to FIGS. 18 and 19, the holes 126*h* in the reflective sheet 126 may be arranged in a matrix in the central portion 126P of the reflective sheet 126. For example, the holes 126*h* in a first row R1 and the holes 126*h* in a second row R2 are arranged along first to sixth columns C1, C2, C3, C4, C5, and C6. Here, the rows R1 and R2 may be formed in the horizontal direction, and the columns C1, C2, C3, C4, C5, and C6 may be formed in the vertical direction.

Light patterns DPP, DPa, DPaa, DPb, DPbb, DPc, and DPd may be located or formed on the central portion 126P and the side portions 126C of the reflective sheet 126. Light patterns DP10, DP10', and DP10" may be located or formed around the holes 126*h* in the reflective sheet 126. For example, the light patterns DPP, DPa, DPaa, DPb, DPbb, DPc, DPd, DP10, DP10', and DP10" may be formed by printing black or gray ink on the reflective sheet 126, and may be referred to as light absorption patterns because the light patterns may absorb light. In another example, the light patterns DPP, DPa, DPaa, DPb, DPbb, DPc, DPd, DP10, DP10', and DP10" may be formed by printing yellow or other color phosphor on the reflective sheet 126, and may be referred to as light variation patterns or fluorescent patterns since the light patterns may change the color of light.

A central pattern DPP may include a plurality of dots. Each of the dots may be the aforementioned black or gray ink or yellow or other color phosphor. The dots of the central pattern DPP may be disposed in a region elongated in the horizontal direction of the central portion 126P. For example, the region in which the dots of the central pattern DPP are disposed may have a rectangular band shape having a predetermined length LP and a predetermined width WP. The region in which the dots of the central pattern DPP are disposed may be disposed between the holes 126*h* in the first row R1 and the holes 126*h* in the second row R2.

A first side pattern DPa may include a plurality of dots. Each of the dots may be the aforementioned black or gray ink or yellow or other color phosphor. The dots of the first side pattern DPa may be disposed in a region elongated along the first side portion 126Ca. For example, the region in which the dots of the first side pattern DPa are disposed may have a trapezoidal band shape. The short side LAa of the trapezoid may face the central portion 126P, and the long side LAb of the trapezoid may face the end portion 126Cae of the first side portion 126Ca.

A plurality of first middle patterns DPaa may be formed between the short side LAa of the trapezoid and the central portion 126P, and may be spaced apart from each other along the short side LAa. The plurality of first middle patterns DPaa may be located in the columns C1, C2, C3, C4, C5, and C6, and may be aligned with the holes 126*h* in the first row R1. Each of the plurality of first middle patterns DPaa may include a plurality of dots. Each of the dots may be the aforementioned black or gray ink or yellow or other color phosphor. A region in which the dots of each of the first middle patterns DPaa are disposed may be a trapezoidal region. The short side of the trapezoid may be adjacent to the upper side of the central portion 126P, and the long side of the trapezoid may be adjacent to or connected to the lower side (refer to reference symbol LAa) of the first side pattern DPa.

A second side pattern DPb may include a plurality of dots. Each of the dots may be the aforementioned black or gray ink or yellow or other color phosphor. The dots of the second side pattern DPb may be disposed in a region elongated along the second side portion 126Cb. For example, the region in which the dots of the second side pattern DPb are disposed may have a trapezoidal band shape. The short side LBa of the trapezoid may face the central portion 126P, and the long side LBb of the trapezoid may face the end portion 126Cbe of the second side portion 126Cb.

A plurality of second middle patterns DPbb may be formed between the short side LBa of the trapezoid and the central portion 126P, and may be spaced apart from each other along the short side LBa. The plurality of second middle patterns DPbb may be located in the columns C1, C2, C3, C4, C5, and C6, and may be aligned with the holes 126*h* in the second row R2. Each of the plurality of second middle patterns DPbb may include a plurality of dots. Each of the dots may be the aforementioned black or gray ink or yellow or other color phosphor. A region in which the dots of each of the second middle patterns DPbb are disposed may be a trapezoidal region. The short side of the trapezoid may be adjacent to the lower side of the central portion 126P, and the long side of the trapezoid may be adjacent to or connected to the upper side (refer to reference symbol LBa) of the second side pattern DPb.

A third side pattern DPc may include a plurality of dots. Each of the dots may be the aforementioned black or gray ink or yellow or other color phosphor. The dots of the third side pattern DPc may be disposed in a region elongated along the third side portion 126Cc. For example, the region in which the dots of the third side pattern DPc are disposed may have a trapezoidal band shape. The short side LCa of the trapezoid may face the central portion 126P, and the long side LCb of the trapezoid may face the end portion 126Cce of the third side portion 126Cc.

A fourth side pattern DPd may include a plurality of dots. Each of the dots may be the aforementioned black or gray ink or yellow or other color phosphor. The dots of the fourth side pattern DPd may be disposed in a region elongated along the fourth side portion 126Cd. For example, the region in which the dots of the fourth side pattern DPd are disposed may have a trapezoidal band shape. The short side LDa of the trapezoid may face the central portion 126P, and the long side LDb of the trapezoid may face the end portion 126Cde of the fourth side portion 126Cd.

The central portion 126P of the reflective sheet 126 may have a rectangular plate shape elongated in the horizontal direction. The widths Da and Db of the first and second side portions 126Ca and 126Cb of the reflective sheet 126 may be equal to each other. The widths Dc and Dd of the third and fourth side portions 126Cc and 126Cd of the reflective sheet 126 may be equal to each other. The widths Da and Db may be larger than the widths Dc and Dd. In this case, the widths Wa and Wb of the first and second side patterns DPa and DPb may be larger than the widths Wc and Wd of the third and fourth side patterns DPc and DPd. In addition, the above-described first and second middle patterns DPaa and DPbb may be provided in the first and second side portions 126Ca and 126Cb having relatively large widths among the first to fourth side portions 126Ca, 126Cb, 126Cc, and 126Cd.

Accordingly, it may be possible to minimize a phenomenon in which a certain region of the reflective sheet 126 is brighter than the other regions thereof or in which the regions thereof have a difference in the purity of white light. That is, it may be possible to minimize a phenomenon in which a certain region of the display panel 110 (refer to FIG. 2) appears brighter than the other regions thereof or in which the regions thereof have a difference in image quality.

Surround patterns DP10 and open patterns DP10' and DP10" may be located or formed around the holes 126h in the reflective sheet 126. Among the holes 126h in any one of the rows, the surround patterns DP10 may be located or formed around the holes 126h other than the holes 126h located at both ends, and the open patterns DP10' and DP10" may be located or formed around the holes 126h located at both ends.

The surround pattern DP10 may include a plurality of dots and a plurality of lines LP. Each of the dots may be the aforementioned black or gray ink or yellow or other color phosphor. Each of the lines LP may be the aforementioned black or gray ink or yellow or other color phosphor, and may be elongated. The line LP may have higher light absorption or light variation efficiency than a group of dots arranged in a line corresponding to the length of the line LP. For example, a region in which the dots and the lines LP of the surround pattern DP10 are disposed may be formed along sides LU, LD, LL, and LR of an imaginary rectangle surrounding the hole 126h. For example, the density of the dots of the surround pattern DP10 adjacent to the sides LU, LD, LL, and LR of the imaginary rectangle may be higher than the densities of the dots of the light patterns DPP, DPa, DPaa, DPb, DPbb, DPc, and DPd.

A first portion DP11 of the surround pattern DP10 may be formed along the first side LU of the imaginary rectangle, and may include dots and a first line LP1. A first width W11, which is the width of the first portion DP11, may form the minimum width of the surround pattern DP10. The density of the dots may be constant in the width direction of the first portion DP11. Alternatively, the density of the dots may be gradually increased in a direction from the periphery of the first portion DP11 toward the first side LU. The first line LP1 may extend in the longitudinal direction of the first portion DP11 (i.e., the longitudinal direction of the first side LU). The first line LP1 may be located between the dots of the first portion DP11.

A second portion DP12 of the surround pattern DP10 may be formed along the second side LD of the imaginary rectangle, and may include dots and a second line LP2. A second width W12, which is the width of the second portion DP12, may form the maximum width of the surround pattern DP10. The density of the dots may be gradually increased in a direction from the periphery of the second portion DP12 toward the second side LD. The second line LP2 may extend in the longitudinal direction of the second portion DP12 (i.e., the longitudinal direction of the second side LD). The second line LP2 may be located between the dots of the second portion DP12. A pair of second lines LP2a and LP2b may be parallel to each other, and may be spaced apart from each other in the width direction of the second portion DP12.

A third portion DP13 of the surround pattern DP10 may be formed along the third side LL of the imaginary rectangle, and may include dots and a third line LP3. A third width W13, which is the width of the third portion DP13, may be larger than the first width W11 but smaller than the second width W12. The density of the dots may be gradually increased in a direction from the periphery of the third portion DP13 toward the third side LL. The third line LP3 may extend in the longitudinal direction of the third portion DP13 (i.e., the longitudinal direction of the third side LL). The third line LP3 may be located between the dots of the third portion DP13. A pair of third lines LP3a and LP3b may be parallel to each other, and may be spaced apart from each other in the width direction of the third portion DP13.

A fourth portion DP14 of the surround pattern DP10 may be formed along the fourth side LR of the imaginary rectangle, and may include dots and a fourth line LP4. A fourth width W14, which is the width of the fourth portion DP14, may be larger than the first width W11 but smaller than the second width W12. The density of the dots may be gradually increased in a direction from the periphery of the fourth portion DP14 toward the fourth side LR. The fourth line LP4 may extend in the longitudinal direction of the fourth portion DP14 (i.e., the longitudinal direction of the fourth side LR). The fourth line LP4 may be located between the dots of the fourth portion DP14. A pair of fourth lines LP4a and LP4b may be parallel to each other, and may be spaced apart from each other in the width direction of the fourth portion DP14.

For example, the fourth portion DP14 and the third portion DP13 may be symmetrical to each other with respect to the center of the hole 126h.

The number of first lines LP1 may be less than each of the numbers of second to fourth lines LP2, LP3, and LP4. For example, the number of first lines LP1 may be one, and each of the numbers of second to fourth lines LP2, LP3, and LP4 may be two. Alternatively, the number of second lines LP2 may be three or more, and may be greater than each of the numbers of third and fourth lines LP3 and LP4.

Each of the surround patterns DP10 may surround a respective one of the holes 126h located in the second to fifth columns C2, C3, C4, and C5 of the first row R1. In this case, each of the surround patterns DP10 may include a first portion DP11 facing the first middle pattern DPaa of the first side portion 126Ca, a second portion DP12 facing the central pattern DPP, a third portion DP13 facing the third side portion 126Cc, and a fourth portion DP14 facing the fourth side portion 126Cd. These surround patterns DP10 may be referred to as upper surround patterns DP10.

Each of the surround patterns DP10 may surround a respective one of the holes 126*h* located in the second to fifth columns C2, C3, C4, and C5 of the second row R2. In this case, each of the surround patterns DP10 may include a first portion DP11 facing the second middle pattern DPbb of the second side portion 126Cb, a second portion DP12 facing the central pattern DPP, a third portion DP13 facing the third side portion 126Cc, and a fourth portion DP14 facing the fourth side portion 126Cd. These surround patterns DP10 may be referred to as lower surround patterns DP10.

For example, the lower surround patterns DP10 may be symmetrical to the upper surround patterns DP10 with respect to the central pattern DPP.

Each of the open patterns DP10' and DP10" may surround a portion of the circumference of a corresponding one of the holes 126*h* located in the first and sixth columns C1 and C6 of the first row R1. Each of the open patterns DP10' and DP10" may be the same pattern as a portion (e.g., half) of each of the surround patterns DP10. These open patterns DP10' and DP10" may be referred to as upper open patterns DP10' and DP10", and may include a first open pattern DP10' and a second open pattern DP10", which will be described later. For example, the first open pattern DP10' and the second open pattern DP10" may be symmetrical to each other in the leftward-rightward direction.

The first open pattern DP10' may be open toward the third side portion 126Cc, and may surround a portion of the circumference of the hole 126*h* located in the first column C1 of the first row R1. The first open pattern DP10' may include a first portion DP11' facing the first side portion 126Ca, a second portion DP12' facing the central pattern DPP, and a fourth portion DP14' facing the fourth side portion 126Cd. The first portion DP11' may be formed in the same shape as a part (e.g., half) of the first portion DP11, and the first line LP1' of the first portion DP11' may also be formed in the same shape as a part (e.g., half) of the first line LP1. The second portion DP12' may be formed in the same shape as a part (e.g., half) of the second portion DP12, and the second line LP2' of the second portion DP12' may also be formed in the same shape as a part (e.g., half) of the second line LP2. The fourth portion DP14' may include the same dots as those of the fourth portion DP14 and a pair of fourth lines LP4' (LP4*a*' and LP4*b*'). Here, the fourth line LP4*a*' may be shorter than the fourth line LP4*a*.

The second open pattern DP10" may be open toward the fourth side portion 126Cd, and may surround a portion of the circumference of the hole 126*h* located in the sixth column C6 of the first row R1. The second open pattern DP10" may include a first portion DP11" facing the first side portion 126Ca, a second portion DP12" facing the central pattern DPP, and a third portion DP13" facing the third side portion 126Cc. The first portion DP11" may be formed in the same shape as a part (e.g., half) of the first portion DP11, and the first line LP1" of the first portion DP11" may also be formed in the same shape as a part (e.g., half) of the first line LP1. The second portion DP12" may be formed in the same shape as a part (e.g., half) of the second portion DP12, and the second line LP2" of the second portion DP12" may also be formed in the same shape as a part (e.g., half) of the second line LP2. The third portion DP13" may include the same dots as those of the third portion DP13 and a pair of third lines LP3" (LP3*a*" and LP3*b*"). Here, the third line LP3*a*" may be shorter than the third line LP3*a*.

Each of the open patterns DP10' and DP10" may surround a portion of the circumference of a corresponding one of the holes 126*h* located in the first and sixth columns C1 and C6 of the second row R2. Each of the open patterns DP10' and DP10" may be the same pattern as a portion (e.g., half) of each of the surround patterns DP10. These open patterns DP10' and DP10" may be referred to as lower open patterns DP10' and DP10", and may include a first open pattern DP10' and a second open pattern DP10", which will be described later. For example, the first open pattern DP10' and the second open pattern DP10" may be symmetrical to each other in the leftward-rightward direction.

The first open pattern DP10' may be open toward the third side portion 126Cc, and may surround a portion of the circumference of the hole 126*h* located in the first column C1 of the second row R2. The first open pattern DP10' may include a first portion DP11' facing the first middle pattern DPaa of the first side portion 126Ca, a second portion DP12' facing the central pattern DPP, and a fourth portion DP14' facing the fourth side portion 126Cd. The first portion DP11' may be formed in the same shape as a part (e.g., half) of the first portion DP11, and the first line LP1' of the first portion DP11' may also be formed in the same shape as a part (e.g., half) of the first line LP1. The second portion DP12' may be formed in the same shape as a part (e.g., half) of the second portion DP12, and the second line LP2' of the second portion DP12' may also be formed in the same shape as a part (e.g., half) of the second line LP2. The fourth portion DP14' may include the same dots as those of the fourth portion DP14 and a pair of fourth lines LP4' (LP4*a*' and LP4*b*'). Here, the fourth line LP4*a*' may be shorter than the fourth line LP4*a*.

The second open pattern DP10" may be open toward the fourth side portion 126Cd, and may surround a portion of the circumference of the hole 126*h* located in the sixth column C6 of the second row R2. The second open pattern DP10" may include a first portion DP11" facing the second middle pattern DPbb of the second side portion 126Cb, a second portion DP12" facing the central pattern DPP, and a third portion DP13" facing the third side portion 126Cc. The first portion DP11" may be formed in the same shape as a part (e.g., half) of the first portion DP11, and the first line LP1" of the first portion DP11" may also be formed in the same shape as a part (e.g., half) of the first line LP1. The second portion DP12" may be formed in the same shape as a part (e.g., half) of the second portion DP12, and the second line LP2" of the second portion DP12" may also be formed in the same shape as a part (e.g., half) of the second line LP2. The third portion DP13" may include the same dots as those of the third portion DP13 and a pair of third lines LP3" (LP3*a*" and LP3*b*"). Here, the third line LP3*a*" may be shorter than the third line LP3*a*.

For example, the lower open patterns DP10' and DP10" may be symmetrical to the upper open patterns DP10' and DP10" with respect to the central pattern DPP.

Accordingly, it may be possible to minimize a phenomenon in which regions around the holes 126*h* are brighter than the other regions of the reflective sheet 126 or in which the regions of the reflective sheet 126 have a difference in the purity of white light. That is, it may be possible to minimize a phenomenon in which a certain region of the display panel 110 (refer to FIG. 2) appears brighter than the other regions thereof or in which the regions thereof have a difference in image quality.

Referring to FIGS. 1 to 19, a display device according to one aspect of the present disclosure may include a display panel, a frame located behind the display panel, a substrate located between the display panel and the frame, a light source located on the substrate, a lens including a body spaced apart from the substrate and covering the light source, and legs protruding from the body toward the substrate and coupled to the substrate, and a reflective sheet having a hole in which the lens is located and covering the substrate. A boundary of the hole of the reflective sheet may include: first and second straight sections opposite each other with respect to the center of the hole, first and second curved sections opposite each other with respect to the center of the hole and connecting the first and second straight sections, and an end of a protrusion protruding from the first straight section or the second straight section toward the inside of the hole. A portion of a rear surface of the body of the lens may overlap the protrusion in the forward-backward direction.

A front surface of a portion of the reflective sheet forming the first straight section may overlap the body of the lens in the forward-backward direction.

The protruding length of the protrusion from the first straight section or the second straight section may be 5% or more of the diameter of the body of the lens.

The substrate may extend along the first and second straight sections, and may have a width less than a distance between the first and second straight sections. The protrusion may not overlap the substrate in the forward-backward direction.

One side of the protrusion may be connected to the first straight section and may has a length equal to 10% to 25% of the length of the first straight section.

The protrusion may include a first protrusion formed at the first straight section and a second protrusion formed at the second straight section. The first protrusion and the second protrusion may be symmetrical to each other with respect to the center of the hole of the reflective sheet.

The end of the protrusion may be angled or rounded.

The protrusion may have a triangular or trapezoidal shape.

The protrusion may include a groove formed at the end of the protrusion.

The protrusion may include a plurality of protrusions arranged along the first straight section or the second straight section.

The protrusion may be formed at the first straight section, and the reflective sheet may include a cut-line formed at a boundary between the first straight section and the protrusion.

The reflective sheet may include a cut-line formed across the protrusion from the end of the protrusion.

Each of the light source and the lens may be provided in plural, and the hole of the reflective sheet may include a plurality of holes in which the plurality of lenses is located.

The reflective sheet may include a central portion at which the plurality of holes are formed and which covers the substrate and a side portion obliquely bent forward from an edge of the central portion, and the central portion may be disposed between the frame and the body of the lens.

The display device may further include light patterns formed on the central portion and the side portion of the reflective sheet, and some of the light patterns may be formed around the plurality of holes of the reflective sheet.

The display device according the present disclosure has the following effects.

According to at least one of embodiments of the present disclosure, a display device capable of improving image quality may be provided.

According to at least one of embodiments of the present disclosure, a display device capable of preventing a phe-nomenon in which a reflective sheet caught between a substrate and a lens is separated therefrom may be provided.

According to at least one of embodiments of the present disclosure, a display device capable of minimizing the occurrence of mura in a screen by solving a problem in which a reflective sheet is not reliably inserted into a region between a substrate and a lens or is separated from the region between the substrate and the lens may be provided.

According to at least one of embodiments of the present disclosure, various examples of protrusions of a reflective sheet that is caught by a lens may be provided.

According to at least one of embodiments of the present disclosure, a display device capable of minimizing a phe-nomenon in which a portion of a screen corresponding to a portion of a reflective sheet is brighter than the remaining portion of the screen corresponding to the remaining portion of the reflective sheet or in which regions of the screen have a difference in the purity of white light may be provided.

According to at least one of embodiments of the present disclosure, various examples of light patterns of a reflective sheet may be provided.

The additional scope of applicability of the present dis-closure will be apparent from the above detailed description. However, those skilled in the art will appreciate that various modifications and alterations are possible, without departing from the idea and scope of the present disclosure, and therefore it should be understood that the detailed descrip-tion and specific embodiments, such as the preferred embodiments of the present disclosure, are provided only for illustration.

Certain embodiments or other embodiments of the dis-closure described above are not mutually exclusive or dis-tinct from each other. Any or all elements of the embodi-ments of the disclosure described above may be combined or combined with each other in configuration or function.

For example, a configuration "A" described in one embodiment of the disclosure and/or the drawings and a configuration "B" described in another embodiment of the disclosure and/or the drawings may be combined with each other. Namely, although the combination between the con-figurations is not directly described, the combination is possible except in the case where it is described that the combination is impossible.

The above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

What is claimed is:

1. A display device comprising:
a display panel;
a frame located behind the display panel;
a substrate located between the display panel and the frame;
a light source located on the substrate;
a lens including a body and legs, wherein the body is spaced at a distance from the substrate and is positioned to cover the light source, and the legs protrude from the body toward the substrate and couple to the substrate; and
a reflective sheet shaped to define a hole over which the lens is located and also covering the substrate,
wherein a boundary of the hole of the reflective sheet comprises:

first and second straight sections opposite each other with respect to a center of the hole;

first and second curved sections opposite each other with respect to the center of the hole and connecting the first and second straight sections; and an end of a protrusion protruding from the first straight section or the second straight section toward an inside of the hole, wherein a portion of a rear surface of the body of the lens overlaps the protrusion in a forward-backward direction, wherein the substrate extends along the first straight section and the second straight section, and includes a width less than a distance between the first straight second and the second straight section, and wherein the protrusion does not overlap the substrate in the forward-backward direction.

2. The display device according to claim 1, wherein a front surface of a portion of the reflective sheet forming the first straight section overlaps the body of the lens in the forward-backward direction.

3. The display device according to claim 1, wherein a protruding length of the protrusion from the first straight section or the second straight section is 5% or more of a diameter of the body of the lens.

4. The display device according to claim 1, wherein one side of the protrusion is connected to the first straight section and has a length equal to 10% to 25% of a length of the first straight section.

5. The display device according to claim 1, wherein the protrusion comprises:

a first protrusion formed at the first straight section; and a second protrusion formed at the second straight section, wherein the first protrusion and the second protrusion are symmetrical to each other with respect to the center of the hole of the reflective sheet.

6. The display device according to claim 1, wherein the end of the protrusion is angled or rounded.

7. The display device according to claim 6, wherein the protrusion has a triangular or trapezoidal shape.

8. The display device according to claim 1, wherein the protrusion comprises a plurality of protrusions arranged along the first straight section or the second straight section.

9. The display device according to claim 1, wherein the protrusion is formed at the first straight section, and wherein the reflective sheet comprises a cut-line formed at a boundary between the first straight section and the protrusion.

10. The display device according to claim 1, wherein the reflective sheet comprises a cut-line formed across the protrusion from the end of the protrusion.

11. The display device according to claim 1, further comprising:

a plurality of light sources located on the substrate;

a plurality of lenses respectively associated with one of the plurality of light sources, wherein each lens, of the plurality of lenses, includes a body and legs, wherein the body is spaced at a distance from the substrate and is positioned to cover an associated one of the plurality of light sources, and the legs protrude from the body toward the substrate and couple to the substrate; and wherein the reflective sheet is further shaped to define a plurality of holes over which a respective one of the plurality of lenses is located and also cover the substrate.

12. The display device according to claim 11, wherein the reflective sheet further comprises:

a central portion at which the plurality of holes are formed and which covers the substrate; and a side portion obliquely bent forward from an edge of the central portion, and wherein the central portion is disposed between the frame and the body of each of the plurality of lenses.

13. The display device according to claim 12, further comprising light patterns formed on the central portion and the side portion of the reflective sheet, wherein some of the light patterns are formed around the plurality of holes of the reflective sheet.

14. The display device according to claim 13, wherein the light patterns include light absorption patterns or light variation patterns.

15. A display device comprising:

a display panel;

a frame located behind the display panel;

a substrate located between the display panel and the frame;

a light source located on the substrate;

a lens including a body and legs, wherein the body is spaced at a distance from the substrate and is positioned to cover the light source, and the legs protrude from the body toward the substrate and couple to the substrate; and a reflective sheet shaped to define a hole over which the lens is located and also covering the substrate, wherein a boundary of the hole of the reflective sheet comprises:

first and second straight sections opposite each other with respect to a center of the hole;

first and second curved sections opposite each other with respect to the center of the hole and connecting the first and second straight sections; and an end of a protrusion protruding from the first straight section or the second straight section toward an inside of the hole, wherein a portion of a rear surface of the body of the lens overlaps the protrusion in a forward-backward direction, and wherein the protrusion comprises a groove formed at the end of the protrusion.

16. A display device comprising:

a display panel;

a frame located behind the display panel;

a substrate located between the display panel and the frame;

a light source located on the substrate;

a lens including a body and legs, wherein the body is spaced at a distance from the substrate and is positioned to cover the light source, and the legs extend from the body toward the substrate and contact the substrate; and a reflective sheet shaped to define a hole over which the lens is located and is positioned to cover a portion of the substrate, wherein an area adjacent to a boundary of the hole of the reflective sheet comprises:

a first plurality of straight sections and a second plurality of straight sections positioned opposite to the first plurality of straight sections with respect to a center of the hole;

first and second curved sections positioned opposite each other with respect to the center of the hole and each being coupled to one of the first plurality of straight sections and one of the second plurality of straight sections; and a first protrusion positioned between two of the first plurality of straight sections and extending toward an inside of the hole, wherein a portion of a rear surface of the body of the lens overlaps the first protrusion in a forward-backward direction, and wherein the reflective sheet comprises a cut-line formed at the first protrusion.

17. The display device according to claim 16, further comprising:

a second protrusion positioned between two of the second plurality of straight sections and extending toward the inside of the hole, and wherein a portion of the rear surface of the body of the lens overlaps the second protrusion in the forward-backward direction.

* * * * *